US009396443B2

(12) United States Patent
Kaushal et al.

(10) Patent No.: US 9,396,443 B2
(45) Date of Patent: Jul. 19, 2016

(54) SYSTEM AND METHOD FOR LEARNING AND/OR OPTIMIZING MANUFACTURING PROCESSES

(71) Applicant: Tokyo Electron Limited, Tokyo (JP)

(72) Inventors: Sanjeev Kaushal, San Jose, CA (US); Sukesh Janubhai Patel, Cupertino, CA (US)

(73) Assignee: TOKYO ELECTRON LIMITED, Tokyo (JP)

( * ) Notice: Subject to any disclaimer, the term of this patent is extended or adjusted under 35 U.S.C. 154(b) by 412 days.

(21) Appl. No.: 14/097,907

(22) Filed: Dec. 5, 2013

(65) Prior Publication Data

US 2015/0161520 A1 Jun. 11, 2015

(51) Int. Cl.
*G06F 17/00* (2006.01)
*G06N 5/02* (2006.01)
*G06N 99/00* (2010.01)
*G05B 19/418* (2006.01)

(52) U.S. Cl.
CPC ........ *G06N 99/005* (2013.01); *G05B 19/41885* (2013.01); *G05B 2219/31464* (2013.01); *G05B 2219/32017* (2013.01); *G05B 2219/45032* (2013.01); *Y02P 90/14* (2015.11); *Y02P 90/22* (2015.11); *Y02P 90/26* (2015.11)

(58) Field of Classification Search
USPC .......................................................... 706/46
See application file for complete search history.

(56) References Cited

U.S. PATENT DOCUMENTS

| 6,757,667 | B1 | 6/2004 | Patel |
| 7,561,269 | B2* | 7/2009 | Kaushal ........... G01N 21/95607 250/559.22 |
| 7,710,565 | B2* | 5/2010 | Kaushal ............... G01B 21/045 356/392 |
| 7,737,051 | B2* | 6/2010 | Dip ................... H01L 21/31604 257/E21.092 |
| 7,838,072 | B2* | 11/2010 | Kaushal ............ C23C 16/45527 427/248.1 |
| 7,840,391 | B2 | 11/2010 | Dhanekula et al. |
| 8,026,113 | B2* | 9/2011 | Kaushal ............ H01L 21/67253 257/E21.521 |

(Continued)

OTHER PUBLICATIONS

Optimization Models for Feature Selection of Decomposed Nearest Neighbor Cao Xiao; W. A. Chaovalitwongse IEEE Transactions on Systems, Man, and Cybernetics: Systems Year: 2016, vol. 46, Issue: 2 pp. 177-184, DOI: 10.1109/TSMC.2015.2429637 IEEE Journals & Magazines.*

(Continued)

*Primary Examiner* — Michael B Holmes
(74) *Attorney, Agent, or Firm* — Amin, Turocy & Watson, LLP

(57) ABSTRACT

A system and method for learning and/or optimizing processes related to semiconductor manufacturing is provided. A learning component generates a set of candidate process models based on process data associated with one or more fabrication tools. The learning component also selects a particular process model from the set of candidate process models that is associated with lowest error. An optimization component generates a set of candidate solutions associated with the particular process model. The optimization component also selects a particular solution from the set of candidate solutions based on a target output value and an output value associated with the particular solution.

20 Claims, 13 Drawing Sheets

(56) References Cited

U.S. PATENT DOCUMENTS

| | | | | |
|---|---|---|---|---|
| 8,078,552 | B2* | 12/2011 | Kaushal | G05B 13/0265 706/12 |
| 8,190,543 | B2* | 5/2012 | Kaushal | G05B 13/0265 706/45 |
| 8,396,582 | B2* | 3/2013 | Kaushal | G05B 13/0265 700/100 |
| 8,723,869 | B2* | 5/2014 | Kaushal | G05B 23/0237 345/440 |
| 8,725,667 | B2* | 5/2014 | Kaushal | G05B 13/0265 700/110 |
| 8,744,607 | B2* | 6/2014 | Kaushal | G05B 13/0265 700/100 |
| 8,954,184 | B2* | 2/2015 | Kaushal | G05B 19/41875 700/104 |
| 9,275,335 | B2* | 3/2016 | Kaushal | G05B 13/0265 |
| 2005/0130109 | A1 | 6/2005 | Kirshenbaum | |
| 2008/0183311 | A1 | 7/2008 | MacArthur et al. | |

OTHER PUBLICATIONS

Multi-optima exploration with adaptive Gaussian mixture model S. Calinon; A. Pervez; D. G. Caldwell Development and Learning and Epigenetic Robotics (ICDL), 2012 IEEE International Conference on Year: 2012 pp. 1-6, DOI: 10.1109/DevLrn.2012.6400808 IEEE Conference Publications.*

Discriminative pronounciation learning using phonetic decoder and minimum-classification-error criterion O. Vinyals; Li Deng; Dong Yu; A. Acero Acoustics, Speech and Signal Processing, 2009. ICASSP 2009. IEEE International Conference on Year: 2009 pp. 4445-4448, DOI: 10.1109/ICASSP.2009.4960616 IEEE Conference Publications.*

Robust two-dimensional principal component analysis via alternating optimization Yipeng Sun; Xiaoming Tao; Yang Li; Jianhua Lu Image Processing (ICIP), 2013 20th IEEE International Conference on Year: 2013 pp. 340-344, DOI: 10.1109/ICIP.2013.6738070 IEEE Conference Publications.*

International Search Report and Written Opinion for PCT Application Serial No. PCT/US14/68672 dated Mar. 6, 2015, 13 pages.

* cited by examiner

| Wafer-ID | Time | Pressure | ... | W260 | ... | F1-CD (1) |
|---|---|---|---|---|---|---|
| 12345 | 1 | 99.8 | | 0.0062043197 | | 55 |
| 12345 | 2 | 98.3 | | 0.0062060496 | | 55 |
| 12345 | 3 | 99.7 | | 0.007829713 | | 55 |
| ... | | | | | | |
| 23456 | 1 | 99.6 | | 0.0065043197 | | 56 |
| 23456 | 2 | 99.9 | | 0.0067043197 | | 56 |
| ... | | | | | | |

FIG. 6

| PROCESS MODEL | QUALITY VALUE | DIVERSITY VALUE |
| --- | --- | --- |
| SELECTED CANDIDATE (CANDIDATE_2) | 0.91 | NONE |
| CANDIDATE_1 | 0.90 | 0.89 |
| CANDIDATE_5 | 0.86 | 0.79 |
| CANDIDATE_7 | 0.86 | 0.76 |
| CANDIDATE_4 | 0.78 | 0.9 |
| CANDIDATE_3 | 0.6 | 0.85 |
| CANDIDATE_6 | 0.59 | 0.83 |

FIG. 7

| SOLUTION ⎬802 | OUTPUT ⎬804 | INPUT_1 ⎬806 | INPUT_2 ⎬808 | INPUT_3 ⎬810 | QUALITY VALUE ⎬812 | DIVERSITY VALUE ⎬814 |
|---|---|---|---|---|---|---|
| CANDIDATE_3 | 1299 | 25 | 50 | 300 | 0.99 | NONE |
| CANDIDATE_1 | 1303 | 28 | 58 | 330 | 0.97 | 0.93 |
| CANDIDATE_4 | 1297 | 25 | 52 | 305 | 0.97 | 0.89 |
| CANDIDATE_2 | 1320 | 22 | 49 | 310 | 0.80 | 0.91 |

SYSTEM AND METHOD FOR LEARNING AND/OR OPTIMIZING MANUFACTURING PROCESSES

TECHNICAL FIELD

The described and claimed subject matter relates generally to techniques for learning and/or optimizing manufacturing processes.

BACKGROUND

Technological advances have lead to process-driven automated equipment that is increasingly complex. A tool system to accomplish a specific goal or perform a specific, highly technical process can commonly incorporate multiple functional elements to reach the goal or successfully execute the process, and various sensors that collect data to monitor the operation of the equipment. Such automated equipment can generate a large volume of data. Data can include information related to a product or a service performed as a part of the specific task and/or sizable log information related to the process. For example, process data and/or metrology data can be collected during a manufacturing process and/or stored in one or more datasets.

While modern electronic storage technologies can afford retaining constantly increasing quantities of data, utilization of the accumulated data remains far from optimal. Examination and interpretation of collected information generally requires human intervention. Furthermore, collected information can be limited and/or costly to obtain. For example, a process on a semiconductor manufacturing tool may run for seventeen hours (e.g., 61,200 seconds). During processing, the semiconductor manufacturing tool may output sensor measurements every second via, for example, several hundred sensors. Accordingly, large data sets that include the output sensor measurements must then be manually studied (e.g., by process engineers) during process development and/or troubleshooting activities. Furthermore, when a process related to the semiconductor manufacturing tool is concluded, qualities (e.g., thickness, particle count) for several wafers generated by the semiconductor manufacturing tool must be manually measured (e.g., by manufacturing engineers).

The above-described deficiencies of today's fabrication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a learning component and an optimization component. The learning component generates a set of candidate process models based on process data associated with one or more fabrication tools, and selects a particular process model from the set of candidate process models that is associated with lowest error. The optimization component generates a set of candidate solutions associated with the particular process model, and selects a particular solution from the set of candidate solutions based on a target output value and an output value associated with the particular solution In accordance with another implementation, a method provides for generating a set of candidate process models based on process data associated with one or more fabrication tools, generating a quality value for each candidate process model in the set of candidate process models, selecting a particular process model from the set of candidate process models based on the quality value associated with each candidate process model in the set of candidate process models, generating a set of candidate solutions associated with the particular process model, and selecting a particular solution from the set of candidate solutions based on a target output value and an output value associated with the particular solution.

In accordance with yet another implementation, a computer-readable medium having stored thereon computer-executable instructions that, in response to execution by a system including a processor, cause the system to perform operations, the operations including generating a set of candidate process models based on process data associated with one or more fabrication tools, generating a quality value for respective candidate process models in the set of candidate process models, selecting a particular process model from the set of candidate process models based on the quality value associated with respective candidate process models in the set of candidate process models, generating a set of candidate solutions associated with the particular process model, and selecting a particular solution from the set of candidate solutions based on a target output value and an output value associated with the particular solution.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 6 illustrates an exemplary data matrix, in accordance with various aspects and implementations described herein;

FIG. 7 illustrates an exemplary ranking of candidate process models, in accordance with various aspects and implementations described herein;

FIG. 8 illustrates an exemplary ranking of candidate solutions, in accordance with various aspects and implementations described herein;

DETAILED DESCRIPTION

Figure 1:
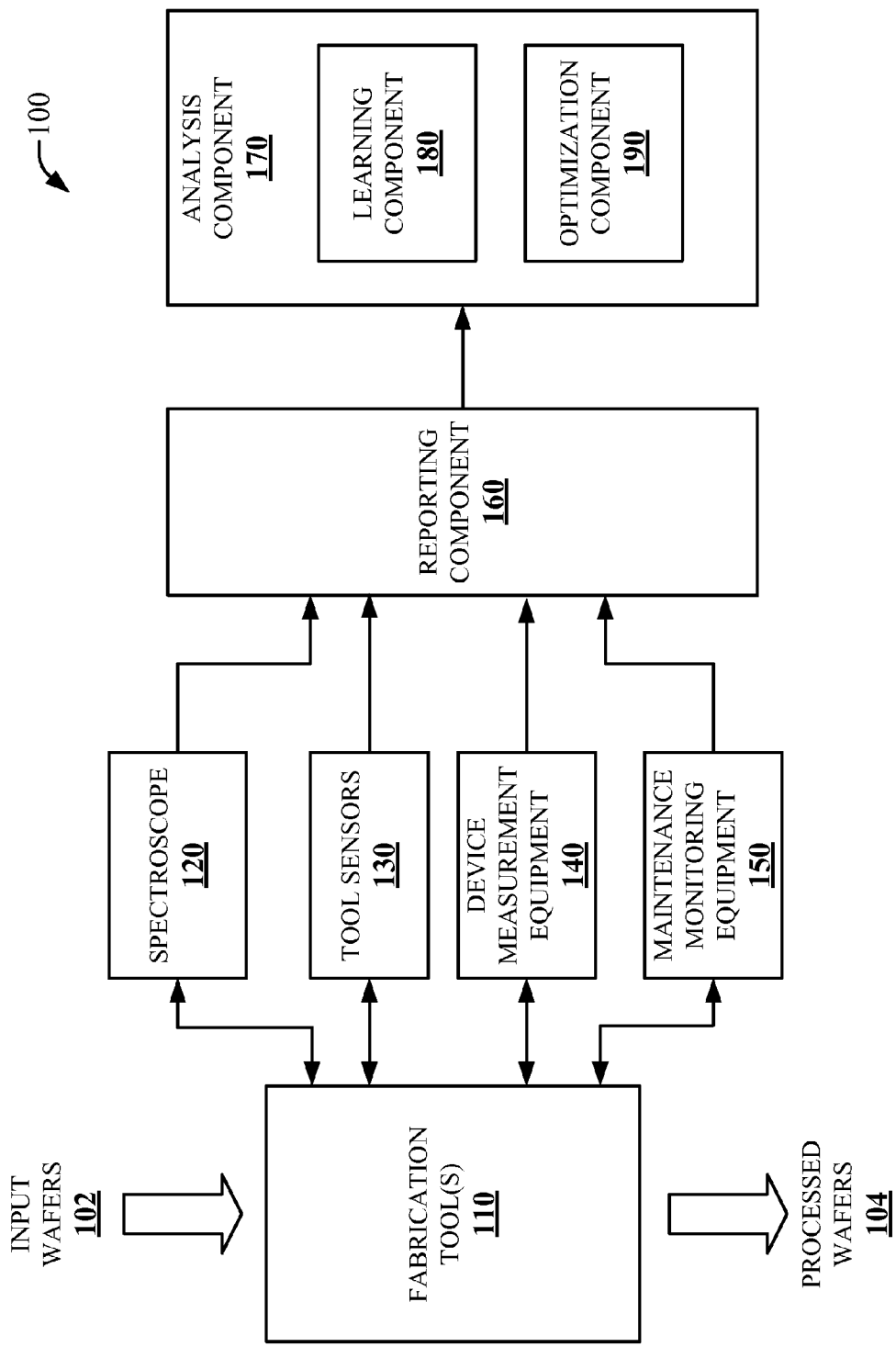
FIG. 1 is block diagram illustrating an exemplary system for learning and/or optimizing processes relating to semiconductor production, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Technological advances have lead to process-driven automated equipment that is increasingly complex. A tool system to accomplish a specific goal or perform a specific, highly technical process can commonly incorporate multiple functional elements to achieve the goal or successfully execute the process, and various sensors that collect data to monitor the operation of the equipment. Such automated equipment can generate a large volume of data. Data can include substantial information related to a product or service performed as a part of the specific task and/or sizable log information related to one or more processes. While modern electronic storage technologies can afford retaining constantly increasing quantities of data, utilization of the accumulated data remains far from optimal. Examination and interpretation of collected information generally requires human intervention. Furthermore, collected information can be limited and/or costly to obtain.

To that end, techniques for learning and/or optimizing processes related to manufacturing (e.g., semiconductor manufacturing) are disclosed. For example, a set of candidate process models based on process data associated with one or more fabrication tools can be generated. Furthermore, a particular process model from the set of candidate process models that is associated with lowest error can be selected. As such, a set of candidate solutions associated with the particular process model can be generated. Furthermore, a particular solution from the set of candidate solutions can be selected based on a target output value and an output value associated with the particular solution. Accordingly, quantity of process data and/or quality of process data can be improved by providing incremental learning and/or incremental optimization on a continuous basis. Furthermore, cost of obtaining process data can be reduced. Therefore, output results of fabrication tools can be constantly improved over time. In an aspect, a short term memory (e.g., a short term model memory) can be implemented to store one or more process models. Additionally or alternatively, another short term memory (e.g., a short term optimization memory) can be implemented to store one or more solutions (e.g., one or more process settings).

Referring initially to FIG. 1, there is illustrated an example system 100 for learning and/or optimizing processes related to manufacturing (e.g., semiconductor production), according to an aspect of the subject disclosure. System 100 can include fabrication tool(s) 110, spectroscope 120, tool sensors 130, device measurement equipment 140, maintenance monitoring equipment 150, reporting component 160 and analysis component 170. Analysis component 170 can include a learning component 180 and an optimization component 190. Fabrication tool(s) 110 can include one or more tools and/or one or more chambers for manufacturing (e.g., semiconductor fabrication). In an aspect, fabrication tool(s) 110 can be associated with a semiconductor fabrication system. For example, as shown in FIG. 1, fabrication tool(s) 110 can receive input wafers 102 and output processed wafers 104. However, it is to be appreciated that fabrication tool(s) 110 can receive and/or generate a different type of asset. In an exemplary, non-limiting embodiment, fabrication tool(s) 110 can be an etch tool that removes unmasked material from input wafers 102 via an etching process (e.g., wet etch, dry etch, plasma etching, etc.) to generate processed wafers 104 having cavities and features formed thereon. Fabrication tool(s) 110 can also be a deposition tool (e.g., atomic layer deposition, chemical vapor deposition, etc.) that deposits material onto input wafers 102 to yield processed wafers 104. However, it is to be appreciated that fabrication tool(s) 110 can be associated with a different type of fabrication system.

A variety of measurement devices, such as spectroscope 120, tool sensors 130, device measurement equipment 140 and/or maintenance monitoring equipment 150, can monitor one or more processes performed by fabrication tool(s) 110 to acquire disparate information relating to various aspects, conditions, or results of the process. As an example, spectroscope 120 can acquire spectral data (e.g., spectral intensity information). For example, spectral data can include a set of intensities for respective wavelengths or spectral lines observable by spectroscope 120. In one example, spectral data can include time-series data such that spectroscope 120 measures intensities for respective wavelengths at regular intervals (e.g., every second, every 2 seconds, every 100 milliseconds, etc.). Spectroscope 120 can also correlate spectral data with wafer IDs associated with specific wafers processed by fabrication tool(s) 110. Accordingly, spectroscope 120 can acquire spectral data individually for each wafer processed by fabrication tool(s) 110.

Tool sensors 130 can monitor and/or measure tool operation characteristics while fabrication tool(s) 110 processes input wafers 102. Furthermore, tool sensors 130 can generate corresponding sensor measurement data. Sensor measurement data, similar to spectral data measured by spectroscope 120, can be time-series data correlated on a per-wafer basis. Sensor measurement data can include measurements from a variety of sensors. Such measurements can include, but are not limited to, pressures within one or more chambers of fabrication tool(s) 110, gas flows for one or more distinct gases, temperatures, upper radio frequency (RF) power, elapsed time since last wet-clean, age of tool parts, and the like. In an aspect, sensor measurement data can be associated with physical quantities. In another aspect, sensor measurement data can be associated with virtual quantities.

Device measurement equipment 140 can generate device measurement data. For example, device measurement equipment 140 can measure physical and geometric properties of wafers and/or features fabricated on wafers. For instance, device measurement equipment 140 can measure development inspection critical dimension (DI-CD), final inspection critical dimension (FI-CD), etch bias, thickness, and so forth, at predetermined locations or regions of wafers. The measured properties can be aggregated on a per-location, per-wafer basis and output as device measurement information. Properties of wafers are typically measured before processing or after processing. Accordingly, device measurement data can be time-series data acquired at a different interval as compared with spectral data and sensor data.

Maintenance monitoring equipment 150 can be implemented to acquire and/or generate maintenance data associated with fabrication tool(s) 110. For example, maintenance data can include, but is not limited to, elapsed time since a last preventative maintenance, age of one or more components associated with fabrication tool(s) 110 (e.g., production time associated with a component), and the like.

Reporting component 160 and/or analysis component 170 can receive data (e.g., process data) acquired and/or generated by as spectroscope 120, tool sensors 130, device measurement equipment 140 and/or maintenance monitoring equipment 150. In an aspect, reporting component 160 and/or analysis component 170 can receive the process data as the process data is generated (e.g., during an on-line mode). In another aspect, reporting component 160 and/or analysis component 170 can receive the process data upon completion of one or more processes associated with fabrication tool(s) 110. In an aspect, process data can be consolidated in a data matrix. For example, a data matrix can include sensor measurement data, spectral data, device measurement data and/or maintenance data. In another aspect, a data matrix (e.g., a new data matrix) can be generated incrementally to initiate a new learning cycle.

In an aspect, reporting component 160 can normalize process data. For example, reporting component 160 can normalize process data to account for error associated with fabrication tool(s) 110. For example, reporting component 160 can normalize spectral data (e.g., measured intensities) to account for measurement error of intensity of spectral lines in different tools and/or chambers included in fabrication tool(s) 110. In a non-limiting example, reporting component can compute a variable (e.g., total light intensity) associated with an arbitrarily selected reference chamber or reference tool included in fabrication tool(s) 110 to normalize process data.

In one or more embodiments, process data can be derived from tool process logs that record parameter data and/or performance data measured during respective runs of fabrication tool(s) 110. Tool process logs can include measurement data from spectroscope 120, tool sensors 130, device measurement equipment 140 and/or maintenance monitoring equipment 150. Measurements recorded in such tool process logs can include, but are not limited to, sensor readings (e.g., pressures, temperatures, power, etc.), maintenance related readings (e.g., age of focus ring, age of mass flow controller, time since last performed maintenance, time since last batch of resist was loaded, etc.), and/or tool and performance statistics (e.g., time to process wafer, chemical consumption, gas consumption, etc.).

In an exemplary scenario, a tool process log can be generated by reporting component 160 at the end of each process run of fabrication tool(s) 110. At the end of a process run, data from one or more of the spectroscope 120, tool sensors 130, device measurement equipment 140, or maintenance monitoring equipment 150 can be provided to reporting component 160, which can aggregate the collected data in a tool process log for the run. A tool process log can correspond to a single semiconductor wafer processed during the run, or a batch of semiconductors fabricated during the run. The tool process logs can then be stored for reporting or archival purposes. In an aspect, process data can be provided automatically by reporting component 160 or a related device. In another aspect, process data can be provided to analysis component 170 manually by an operator.

Although the foregoing example describes process data as being retrieved or extracted from tool process logs, it is to be appreciated that process data may also be provided to analysis component 170 by other means. For example, in some embodiments, all or a subset of process data may be provided directly to analysis component 170 from devices 120, 130, 140 and/or 150.

Learning component 180 can generate a set of candidate process models based on the process data associated with the fabrication tool(s) 110. Each candidate process model in the set of candidate process models can be a mathematical process model (e.g., a candidate function). For example, each candidate process model in the set of candidate process models can be implemented to learn a mathematical process model for an output as a function of the process data (e.g., tunable inputs, input parameters, etc.). In an aspect, each candidate process models in the set of candidate process models can be generated using one or more genetic algorithms (e.g., genetic programming). In another aspect, each candidate process models in the set of candidate process models can be generated using a curve fitting technique. For example, each candidate process model in the set of candidate process models can be generated using linear approximation, multi-linear approximation, polynomial curve fitting, neural networks, etc. However, it is to be appreciated that each candidate process model in the set of candidate process models can be generated using a different type of technique. In yet another aspect, learning component can generate a new set of candidate process models in response to receiving new process data (e.g., new process data associated with a new run associated with fabrication tool(s) 110, new process data associated with a new step associated with a new run associated with fabrication tool(s) 110, etc.).

In an aspect, each candidate process model in the set of candidate process models can be associated with a different amount of process data. For example, a first candidate process model can be associated with a first amount of process data, the second candidate process model can be associated with a second amount of process data, etc. Additionally or alternatively, one or more of the candidate process models in the set of candidate process models can be associated with a different number of parameters (e.g., input parameters, tunable inputs, etc.). For example, a first candidate process model can be associated with a first number of parameters, a second candidate process model can be associated with a second number of parameters, etc. In another aspect, a user can specify a range (e.g., a minimum value, a maximum value, a mean value, a standard deviation value, etc.) for each of the parameters (e.g., input parameters, tunable inputs, etc.).

Learning component 180 can generate a quality value (e.g., a predicted performance value) for each candidate process model in the set of candidate process models. A quality value can be a measure of a predicted performance for a corresponding candidate process model. For example, a quality value can be a measure that compares a predicted output of a candidate process model to a measured output of the candidate process model. In an aspect, a quality value can be generated based on a mean squared error (MSE). For example, a quality value can be generated based on a root MSE. In another aspect, a quality value can be generated based on correlation. In yet another aspect, a quality value can be generated based on coefficient of determination ($R^2$). However, it is to be appreciated that another type of quality measurement can be implemented to generate a quality value. In an aspect, learning component 180 can normalize a quality measurement for each candidate process model in the set of candidate process models. For example, a quality value for each candidate process model in the set of candidate process models can be equal to $1/(1-MSE)$.

Furthermore, learning component 180 can generate a diversity value (e.g., a similarity value, a uniqueness value, etc.). A diversity value can be a measure of uniqueness of a candidate process model with respect to another candidate process model in the set of candidate process models. For example, an output value generated by a candidate process model in the set of candidate process models can be compared with other output values generated by other candidate process models in the set of candidate process models. In one example, a diversity value can equal zero when an output of a candidate process model is equal to an output of another candidate process model. In an aspect, a diversity value can be generated based on a cosine function (e.g., a first output vector associated with a candidate process model and a second output vector associated with another candidate process model). In another aspect, a diversity value can be generated based on a Halstead metric (e.g., a Halstead complexity measure). In another aspect, a diversity value can be generated based on an inverse of similarity measurement. However, it is to be appreciated that another type of diversity measurement (e.g., similarity measurement) can be implemented to generate a diversity value.

Learning component 180 can compare each candidate process model in the set of candidate process models to determine a particular candidate process model with highest quality (e.g., a highest quality process model). For example, learning component 180 can compare a quality values for each candidate process model in the set of candidate process models to determine a particular candidate process model with a lowest MSE value. In another example, learning component 180 can compare a quality values for each candidate process model in the set of candidate process models to determine a particular candidate process model with a highest performance value (e.g., $1/(1-MSE)$). As such, learning component 180 can select a particular process model from the set of candidate process models that is associated with lowest error. Moreover, the quality value generated for each candidate process model in the set of candidate process models can facilitate selection of the particular process model from the set of candidate process models.

Furthermore, learning component 180 can rank each candidate process model in the set of candidate process models. For example, learning component 180 can rank each remaining candidate process model in the set of candidate process models (e.g., with respect to the highest quality process model) based on a corresponding quality value and a corresponding diversity value. As such, ranking of candidate process models can be sorted initially based on quality and then based on diversity. For example, the highest quality process model can be ranked first. Remaining candidate process model in the set of candidate process models can be ranked with respect to the highest quality process model based on a quality value associated with each remaining candidate process model. Then, the remaining candidate process models in the set of candidate process models can be further ranked with respect to the highest quality process model based on a diversity value associated with each remaining candidate process model. A higher diversity value (e.g., corresponding to greater uniqueness) can be associated with a higher ranking. As such, candidate process models that are higher in quality while being more unique with respect to the highest quality process model can be ranked higher. In an aspect, learning component 180 can rank each remaining candidate process model in the set of candidate process models with respect to the highest quality process model based on weighted average. However, it is to be appreciated that learning component 180 can rank each remaining candidate process model in the set of candidate process models with respect to the highest quality process model based on a different ranking technique.

In an aspect, learning component 180 can select a subset of the set of candidate process models. For example, learning component 180 can select a subset of candidate process models based on the ranking of the candidate process models. In a non-limiting example, learning component 180 can select the three most highly ranked candidate process models (e.g., the highest quality process model and two other candidate process models ranked after the highest quality process model). Accordingly, learning component 180 can select one or more process models from the set of candidate process models based on a ranking of quality values and diversity values associated with the set of candidate process models. In an aspect, learning component 180 can select a subset of candidate process models based on the ranking and an available size associated with a memory (e.g., a short term model memory). For example, learning component 180 can select a subset of candidate process models based on the ranking to fill available memory locations associated with the memory (e.g., the short term model memory).

Optimization component 190 can receive a target output value. Furthermore, optimization component 190 can generate a set of candidate solutions. Each solution can be a set of values for inputs associated with the highest quality process model (e.g., the process model selected by learning component 180). For example, the highest quality process model can be associated with a plurality of inputs (e.g., input parameters). Each candidate solution can include a value for each input associated with the highest quality process model (e.g., each candidate solution can include a set of input values). In an aspect, optimization component 190 can generate the set of candidate solutions based on one or more genetic algorithms (e.g., genetic algorithm for optimization). In another aspect, optimization component 190 can generate the set of candidate solutions based on simulated annealing. In yet another aspect, optimization component 190 can generate the set of candidate solutions based on hill climbing optimization technique. However, it is to be appreciated that optimization component 190 can generate the set of candidate solutions based on a different type of optimization technique.

Optimization component 190 can utilize the highest quality process model (e.g., the process model selected by learning component 180) to predict an output value (e.g., a result value) for each candidate solution in the set of candidate solutions. Accordingly, optimization component 190 can generate a set of candidate process parameters based on the highest quality process model (e.g., the process model selected by learning component 180).

Optimization component 190 can generate a quality value (e.g., a predicted performance value) for each candidate solutions in the set of candidate solutions. A quality value can be a measure of a predicted performance for a corresponding candidate solution. For example, a quality value can be a measure of error between the target output value and an output value (e.g., a predicted output value) associated with a candidate solution. In an aspect, a quality value can be generated based on MSE. For example, a quality value can be generated based on a normalized MSE. In another aspect, a quality value can be generated based on correlation. In yet another aspect, a quality value can be generated based on coefficient of determination ($R^2$). However, it is to be appreciated that another type of quality measurement can be implemented to generate a quality value.

Optimization component 190 can rank each candidate solution in the set of candidate solutions based on a corresponding quality value and the target output value. For example, optimization component 190 can rank each of candidate solution in the set of candidate solutions to select a candidate solution with highest quality (e.g., a candidate solution with lowest error between the target output value and a predicted output value associated with the candidate solution). As such, optimization component 190 can determine a candidate solution with highest quality (e.g., a highest quality solution). Therefore, the quality value for each candidate solution in the set of candidate solutions can facilitate selection of the highest quality solution. Accordingly, optimization component 190 can selects a highest quality solution based on the target output value and an output value (e.g., a predicted output value) associated with the highest quality solution.

Furthermore, optimization component 190 can generate a diversity value for each candidate solution in the set of candidate solutions. A diversity value can be a measure of uniqueness of a particular candidate solution with respect to the highest quality solution (e.g., the candidate solution with highest quality). In an aspect, a diversity value can be generated based on a cosine function (e.g., a first output vector associated with a particular candidate solution and a second output vector associated with the highest quality solution). In another aspect, a diversity value can be generated based on a Halstead metric (e.g., a Halstead complexity measure). In another aspect, a diversity value can be generated based on an inverse of similarity measurements. However, it is to be appreciated that another type of diversity measurement can be implemented to generate a diversity value.

Optimization component 190 can compare the highest quality solution with other candidate solutions in the set of candidate solutions. For example, optimization component 190 can rank each remaining candidate solution in the set of candidate solutions with respect to the highest quality solution based on quality and diversity. For example, the highest quality solution can be ranked first. Therefore, the remaining candidate solutions in the set of candidate solutions can be ranked with respect to the highest quality solution based on a quality value associated with each of the remaining candidate solutions. Then, the remaining candidate solutions in the set of candidate solutions can be further ranked with respect to the highest quality solution based on a diversity value associated with each of the remaining candidate solutions. As such, candidate solutions that are higher in quality while being more unique with respect to the highest quality solution can be ranked higher. In an aspect, optimization component 190 can rank each remaining candidate solution in the set of candidate solutions with respect to the highest quality solution based on weighted average. However, it is to be appreciated that optimization component 190 can rank each remaining candidate solution in the set of candidate solutions with respect to the highest quality solution based on a different ranking technique.

In an aspect, optimization component 190 can select a subset of the set of candidate solutions. For example, optimization component 190 can select a subset of candidate solutions based on the ranking of the candidate solutions. In a non-limiting example, optimization component 190 can select the three most highly ranked candidate solutions (e.g., the highest quality solution and two other candidate solutions ranked after the selected candidate solution). Accordingly, optimization component 190 can select one or more solutions from the set of candidate solutions based on a ranking of quality values and diversity values associated with the set of candidate solutions. In an aspect, optimization component 190 can select a subset of candidate solutions based on the ranking and an available size associated with a memory (e.g., a short term optimization memory). For example, optimization component 190 can select a subset of candidate solutions based on the ranking to fill available memory locations associated with the memory (e.g., the short term optimization memory).

In an aspect, learning component 180 can further transmit a different selected process model (e.g., a new process model) to optimization component 190. Optimization component 190 can utilize numerical differentiation to calculate a differential of an output value (e.g., a predicted output value) of the different selected process model and an input parameter associated with the different selected process model (e.g., a numerical derivate can be calculated for each available input parameter associated with the different selected process model). As such, optimization component 190 can be configured to only determine modifications to input parameters that have non-zero first derivatives. Accordingly, optimization component 190 can limit searches for modifications to input parameters that impact an output value with respect to the new process model.

Therefore, the process model selected by the learning component 180 can be utilized to control and/or optimize a fabrication process by tuning input parameters to achieve a desired target output value. For example, input parameters can be tuned (e.g., adjusted on a run-to-run basis, adjusted on a step-to-step basis, etc.) such that an output value (e.g., a predicted output value) of the process model selected by the learning component is within a desired range associated with the target output value. A process associated with fabrication tool(s) 110 can then be run with the parameter values (e.g., solution) identified by optimization component 190. Upon completion of the process, the actual output can be measured and the difference between the measured output versus the predicted output can be computed as error. Therefore, process optimization can be realized to drive error towards zero during manufacturing processes associated with fabrication tool(s) 108 (e.g., manufacturing processes associated with fabrication tool(s) 108 can be optimally controlled).

Figure 2:
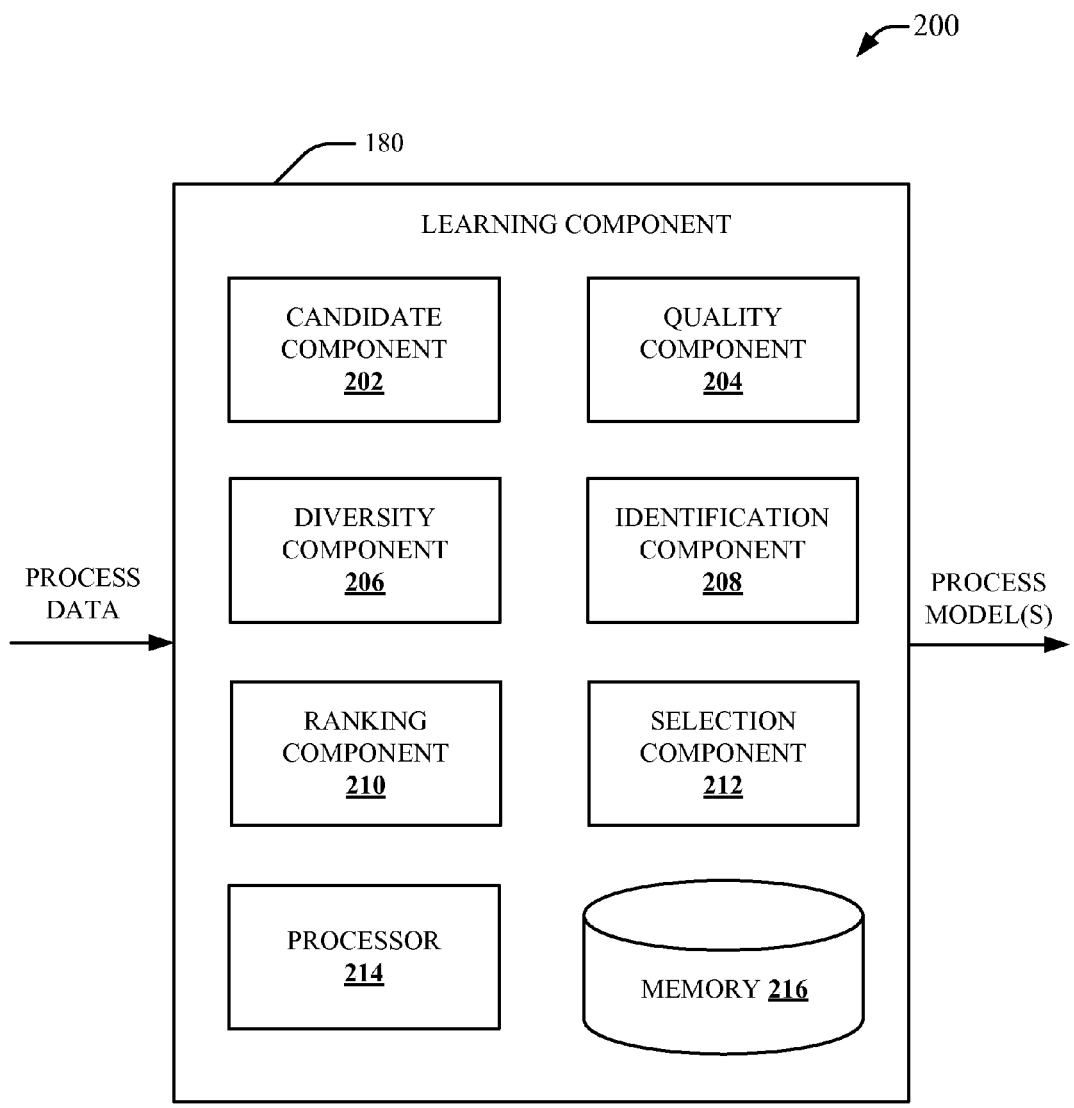
FIG. 2 is a block diagram illustrating an exemplary learning component, in accordance with various aspects and implementations described herein.

FIG. 2 illustrates a non-limiting implementation of a system 200 in accordance with various aspects and implementations of this disclosure. System 200 includes learning component 180. Learning component 180 can include a candidate component 202, a quality component 204, a diversity component 206, an identification component 208, a ranking component 210 and/or a selection component 212. Aspects of system 200 can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 200 can include memory 216 for storing computer executable components and instructions. System 200 can further include a processor 214 to facilitate operation of the instructions (e.g., computer executable components and instructions) by system 200.

Learning component 180 (e.g., candidate component 202, quality component 204, diversity component 206, identification component 208, ranking component 210 and/or selection component 212) can facilitate autonomous learning to maximize quality and diversity (e.g., minimize error and maximize uniqueness) of a process model for one or more manufacturing processes associated with fabrication tool(s) 110. Accordingly, learning component 180 can adapt to changing conditions and/or manufacturing situations associated with fabrication tool(s) 110. Moreover, learning component 180 can prevent myopic generation and/or selection of process models associated with fabrication tool(s) 110 (e.g., by generating and/or selecting a greater sample set of process models). Therefore, learning component 180 can minimize overfitting of generated and/or selected process models.

Candidate component 202 can generate one or more candidate process models (e.g., one or more potential process models) for one or more manufacturing processes associated with fabrication tool(s) 110. For example, candidate component 202 can generate a set of candidate process models based on process data (e.g., PROCESS DATA shown in FIG. 2) associated with one or more tools (e.g., fabrication tool(s) 110). Each candidate process model in the set of candidate process models can be a mathematical process model (e.g., a candidate function). For example, each candidate process model in the set of candidate process models can be implemented to learn a mathematical process model for an output as a function of the process data. In an aspect, candidate component 202 can implement one or more genetic algorithms to generate each of the candidate process models in the set of candidate process models. In another aspect, candidate component 202 can implement a curve fitting technique to generate each of the candidate process models in the set of candidate process models. For example, each candidate process model in the set of candidate process models can be generated using linear approximation, multi-linear approximation, polynomial curve fitting, neural networks, etc. However, it is to be appreciated that candidate component 202 can implement a different type of technique to generate each candidate process model in the set of candidate process models.

Quality component 204 can facilitate selection of one or more process models generated by candidate component 202. For example, quality component 204 can facilitate selection of a process model with lowest error (e.g., and/or one or more other process models based on error) from the set of candidate process models. Quality component 204 can generate a quality value (e.g., a predicted performance value) for each of the candidate process models in the set of candidate process models. A quality value can be a measure of a predicted performance for a corresponding candidate process model. For example, a quality value can be a measure that compares a predicted output of a candidate process model to a measured output of the candidate process model. In an aspect, a quality value can be associated with a MSE value. For example, a quality value can be associated with a root MSE value. In another aspect, a quality value can be associated with a correlation value. In yet another aspect, a quality value can be associated with a coefficient of determination value. However, it is to be appreciated that another type of quality measurement can be associated with a quality value. In an aspect, a quality value can be associated with a normalized value. For example, a quality value can be equal to $1/(1-\text{MSE})$.

Diversity component 206 can further facilitate selection of one or more process models generated by candidate component 202. For example, diversity component 206 can facilitate selection of a diverse subset of candidate process models from the set of candidate process models. Diversity component 206 can generate a diversity value (e.g., a similarity value, a uniqueness value, etc.). A diversity value can be a measure of uniqueness of a candidate process model with respect to another candidate process model. For example, an output value (e.g., a predicted output value) generated by a candidate process model in the set of candidate process models can be compared with other output values (e.g., other predicted output values) generated by other candidate process models in the set of candidate process models. In one example, an output value (e.g., a predicted output value) generated by a candidate process model in the set of candidate process models can be compared with other output values (e.g., other predicted output values) generated by other candidate process models in the set of candidate process models. In an aspect, a diversity value can be associated with a cosine function (e.g., a first output vector associated with a candidate process model and a second output vector associated with another candidate process model). In another aspect, a diversity value can be associated with a Halstead metric (e.g., a Halstead complexity measure). In yet another aspect, a diversity value can be associated with inverse of similarity measurements. However, it is to be appreciated that another type of diversity measurement can be associated with a diversity value.

Identification component 208 can identify a candidate process model in the set of candidate process models with highest quality (e.g., by comparing quality values generated by quality component 204). For example, identification component 208 can identify a candidate process model in the set of candidate process models associated with a lowest MSE value (e.g., identification component 208 can identify a quality value associated with a lowest MSE value). As such, identification component 208 can identify a process model with lowest error (e.g., from the set of candidate process models). Furthermore, identification component 208 can tag (e.g., label, mark, etc.) the candidate process model in the set of candidate process models associated with the lowest MSE value as the candidate process model with highest quality (e.g., a highest quality process model). As such, identification component 208 can identify a particular process model from the set of candidate process models that is associated with lowest error. Furthermore, the quality value generated for each candidate process model in the set of candidate process models can facilitate identification of the highest quality process model.

Ranking component 210 can rank candidate process models in the set of candidate process models based on quality values generated by quality component 204. For example, candidate process models not identified as the highest quality process model can be ranked with respect to the highest quality process model. As such, the candidate process model with highest quality (e.g., lowest MSE) can be ranked first, a candidate process model with second highest quality (e.g., second lowest MSE) can be ranked second, etc. Additionally, ranking component 210 can rank candidate process models in the set of candidate process models based on diversity values generated by diversity component 206. For example, the ranking of candidate process models based on quality values can further be sorted based on diversity values generated by diversity component 206. As such, a ranking of candidate process models with the same quality value can be determined based on a diversity value associated with the candidate process models with the same quality value. For example, a higher diversity value (e.g., a diversity value corresponding to greater uniqueness with respect to the highest quality process model) can correspond to a higher ranking.

Therefore, candidate process models with a higher ranking can correspond to higher quality and greater diversity with respect to the highest quality process model. In an aspect, ranking component 210 can additionally or alternatively rank candidate process models in the set of candidate process models based on weighted average. However, it is to be appreciated that ranking component 210 can additionally or alternatively rank candidate process models in the set of candidate process models based on a different ranking technique. As such, ranking component 210 can sort the set of candidate process models to facilitate selection of a subset of candidate process models that are associated with lowest error while being maximally diverse.

Selection component 212 can select a subset of the candidate process models (e.g., the highest quality process model and/or one or more other process models in the set of candidate process models) based on the ranking generated by the ranking component 210. For example, selection component 212 can select a certain number of candidate process models with a high ranking (e.g., top three most highly ranked, top five most highly ranked, etc.). As such, selection component 212 can select a subset of the candidate process models that are associated with lowest error while being maximally diverse (e.g., selection component 212 can select a subset of the candidate process models with a strong correlation to high quality while being diverse to prevent being limited to overly similar process models). For example, selection component 212 can select a sample set of candidate process models to improve quality of processed wafers 104 generated by fabrication tool(s) 110 while considering different conditions and/or manufacturing situations (e.g., process cycles) associated with fabrication tool(s) 110. Therefore, a sample set of candidate process models selected by selection component 212 is not limited to a group of almost identical process models.

In an aspect, selection component 212 can additionally select a subset of the candidate process models based on an available size of a memory. For example, selection component 212 can select a certain number of candidate process models with a high ranking based on an available size of a memory (e.g., a short term model memory). As such, learning component 180 can generate one or more process models (e.g., PROCESS MODEL(S) shown in FIG. 2). In an aspect, learning component 180 can transmit a candidate process model with highest quality (e.g., the highest quality process model identified by identification component 208) to optimization component 190. In another aspect, learning component 180 can store a candidate process model with highest quality (e.g., the highest quality process model identified by identification component 208) and/or one or more other candidate process models in a memory (e.g., a short term model memory).

Figure 3:
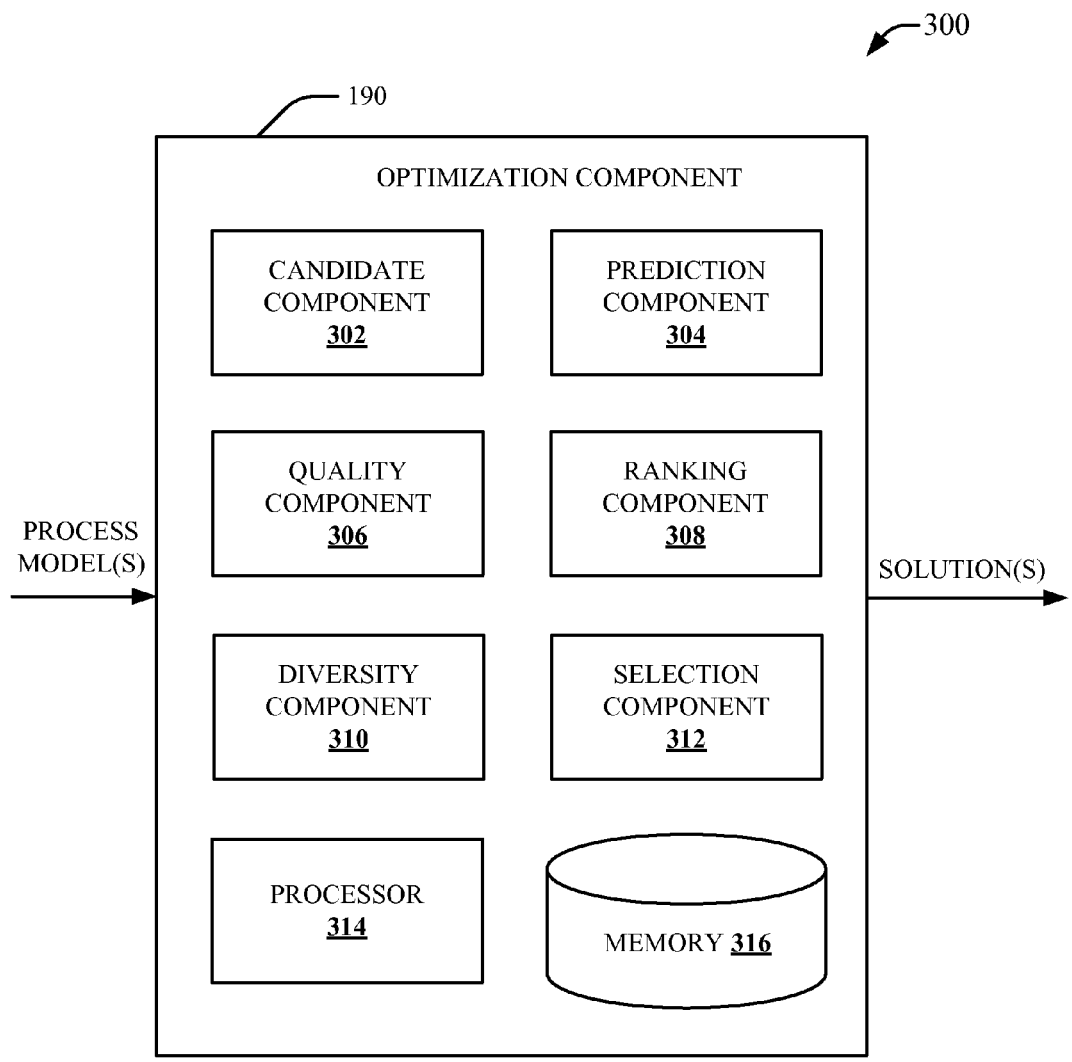
FIG. 3 is a block diagram illustrating an exemplary optimization component, in accordance with various aspects and implementations described herein.

FIG. 3 illustrates a non-limiting implementation of a system 300 in accordance with various aspects and implementations of this disclosure. System 300 includes optimization component 190. Optimization component 190 can include a candidate component 302, a prediction component 304, a quality component 306, a ranking component 308, a diversity component 310 and/or a selection component 312. Aspects of system 300 can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 300 can include memory 316 for storing computer executable components and instructions. System 300 can further include a processor 314 to facilitate operation of the instructions (e.g., computer executable components and instructions) by system 300. In an aspect, optimization component 190 can be implemented in connection with learning component 190 (e.g., to control and/or optimize process learning provided by learning component 180).

Optimization component 190 (e.g., candidate component 302, prediction component 304, quality component 306, ranking component 308, diversity component 310 and/or selection component 312) can facilitate improved control and/or optimization for maximizing quality and diversity (e.g., minimizing error and maximizing uniqueness) of a solution for a process model associated with fabrication tool(s) 110. Optimization component 190 can adapt to changing conditions and/or manufacturing situations associated with fabrication tool(s) 110. Moreover, optimization component 190 can prevent myopic generation and/or selection of solutions for a process model associated with fabrication tool(s) 110 (e.g., by generating and/or selecting a greater sample set of solutions). Therefore, optimization component 190 can minimize overfitting of generated and/or selected solutions for a process model.

Candidate component 302 can generate one or more candidate solutions (e.g., one or more potential solutions) for a process model associated with fabrication tool(s) 110. Candidate component 302 can generate a set of candidate solutions based on the candidate process model with highest quality (e.g., the highest quality process model identified by identification component 208) and/or a target output value. Each solution can be a set of values for inputs associated with the highest quality process model identified by identification component 208. For example, the highest quality process model identified by identification component 208 can be associated with a plurality of inputs (e.g., input parameters). As such, each candidate solution can include a value for each input associated with the highest quality process model identified by identification component 208. In an aspect, candidate component 302 can generate the set of candidate solutions based on one or more genetic algorithms. In another aspect, candidate component 302 can generate the set of candidate solutions based on simulated annealing. In yet another aspect, candidate component 302 can generate the set of candidate solutions based on hill climbing optimization technique. However, it is to be appreciated that candidate component 302 can generate the set of candidate solutions based on a different type of optimization technique. Candidate component 302 can generate a set of candidate process parameters based on the highest quality process model identified by identification component 208 (e.g., the candidate process model with highest quality).

Prediction component 304 can facilitate selection of one or more solutions generated by candidate component 302. For example, prediction component 304 can utilize the highest quality process model identified by identification component 208 to predict an output value (e.g., a result value) for each candidate solution in the set of candidate solutions. For example, a first output value (e.g., a first predicted output value) can be generated based on the highest quality process model identified by identification component 208 and a first candidate solution, a second output value (e.g., a second predicted output value) can be generated based on the highest quality process model identified by identification component 208 and a second candidate solution, etc. As such, prediction component 304 can generate a set of output values (e.g., a set of predicted output values) based on the highest quality process model identified by identification component 208 and the set of candidate solutions.

Quality component 306 can further facilitate selection of one or more solutions generated by candidate component 302. For example, quality component 306 can facilitate selection of a solution with lowest error (e.g., and/or one or more other solutions based on error) from the set of candidate solutions. Quality component 306 can generate a quality value (e.g., a variance value, a predicted performance value, etc.) for each of the candidate solutions in the set of candidate solutions. A quality value can be a measure of a predicted performance for a corresponding candidate solution. For example, a quality value can be a measure of error (e.g., variance) between the target output value and an output value (e.g., a predicted output value) associated with a candidate solution. In an aspect, a quality value can be associated with a MSE value. For example, a quality value can associated with a normalized MSE value. In another aspect, a quality value can be associated with a correlation value. In yet another aspect, a quality value can be associated with a coefficient of determination value. However, it is to be appreciated that another type of quality measurement can be implemented to generate a quality value.

Ranking component 308 can rank each of the candidate solutions in the set of candidate solutions based on a corresponding quality value and the target output value. As such, ranking component 308 can rank each of the candidate solutions to select (e.g., identify) a candidate solution with highest quality (e.g., a candidate solution with lowest error between the target output value and the output value associated with the candidate solution). Accordingly, ranking component 308 can determine a candidate solution with highest quality (e.g., a highest quality solution). Therefore, ranking component 308 can utilize the quality value for each candidate solution in the set of candidate solutions to facilitate selection of the highest quality solution.

Diversity component 310 can further facilitate selection of one or more solutions generated by candidate component 302. For example, diversity component 310 can facilitate selection of a diverse subset of candidate solutions from the set of candidate solutions. Diversity component 310 can generate a diversity value for each of the candidate solutions in the set of candidate solutions. A diversity value can be a measure of uniqueness of a particular candidate solution with respect to the highest quality solution (e.g., the highest quality solution determined by ranking component 308). In an aspect, a diversity value can be associated with a cosine function (e.g., a first output vector associated with a particular candidate solution and a second output vector associated with the highest quality solution). In another aspect, a diversity value can be associated with a Halstead metric (e.g., a Halstead complexity measure). In another aspect, a diversity value can be associated with an inverse of similarity measurements. However, it is to be appreciated that another type of diversity measurement can be implemented to generate a diversity value.

Additionally, ranking component 308 can rank candidate solutions in the set of candidate solutions based on quality values generated by quality component 306. For example, candidate solutions not identified as the highest quality solution can be ranked with respect to the highest quality solution. As such, the candidate solution with highest quality (e.g., lowest MSE) can be ranked first, a candidate solution with second highest quality (e.g., second lowest MSE) can be ranked second, etc. Additionally, ranking component 308 can rank candidate solutions in the set of candidate solutions based on diversity values generated by diversity component 310. For example, the ranking of candidate solutions based on quality values can further be sorted based on diversity values generated by diversity component 310. As such, a ranking of candidate solutions with the same quality value can be determined based on a diversity value associated with the candidate solutions with the same quality value. For example, a higher diversity value (e.g., a diversity value corresponding to greater uniqueness with respect to the highest quality solution) can correspond to a higher ranking. Therefore, candidate solutions with a higher ranking can correspond to higher quality and greater diversity with respect to the highest quality solution. In an aspect, ranking component 308 can additionally or alternatively rank candidate solutions in the set of candidate solutions based on weighted average. However, it is to be appreciated that ranking component 308 can additionally or alternatively rank candidate solutions in the set of candidate solutions based on a different ranking technique. As such, ranking component 310 can sort the set of candidate solutions to facilitate selection of a subset of candidate solutions that are associated with lowest error while being maximally diverse.

Selection component 312 can select a subset of the candidate solutions (e.g., the highest quality solutions and/or one or more other solutions in the set of candidate solutions) based on the ranking generated by the ranking component 308. For example, selection component 312 can select a certain number of candidate solutions with a high ranking (e.g., top three most highly ranked, top five most highly ranked, etc.). As such, selection component 312 can select a subset of the candidate solutions that are associated with lowest error while being maximally diverse (e.g., selection component 312 can select a subset of the candidate solutions with a strong correlation to high quality while being diverse to prevent being limited to overly similar solutions). For example, selection component 312 can select a sample set of candidate solutions to improve quality of processed wafers 104 generated by fabrication tool(s) 110 while considering different conditions and/or manufacturing situations (e.g., process cycles) associated with fabrication tool(s) 110. Therefore, a sample set of candidate solutions selected by selection component 312 is not limited to a group of almost identical solutions.

In an aspect, selection component 312 can additionally select a subset of the candidate solutions based on an available size of a memory. For example, selection component 312 can select a certain number of candidate solutions with a high ranking based on an available size of a memory (e.g., a short term optimization memory). As such, optimization component 190 can generate one or more solutions (e.g., SOLUTION(S) shown in FIG. 3). In an aspect, optimization component 190 can store the highest quality solution and/or one or more other candidate solutions in a memory (e.g., a short term optimization memory).

Figure 4:
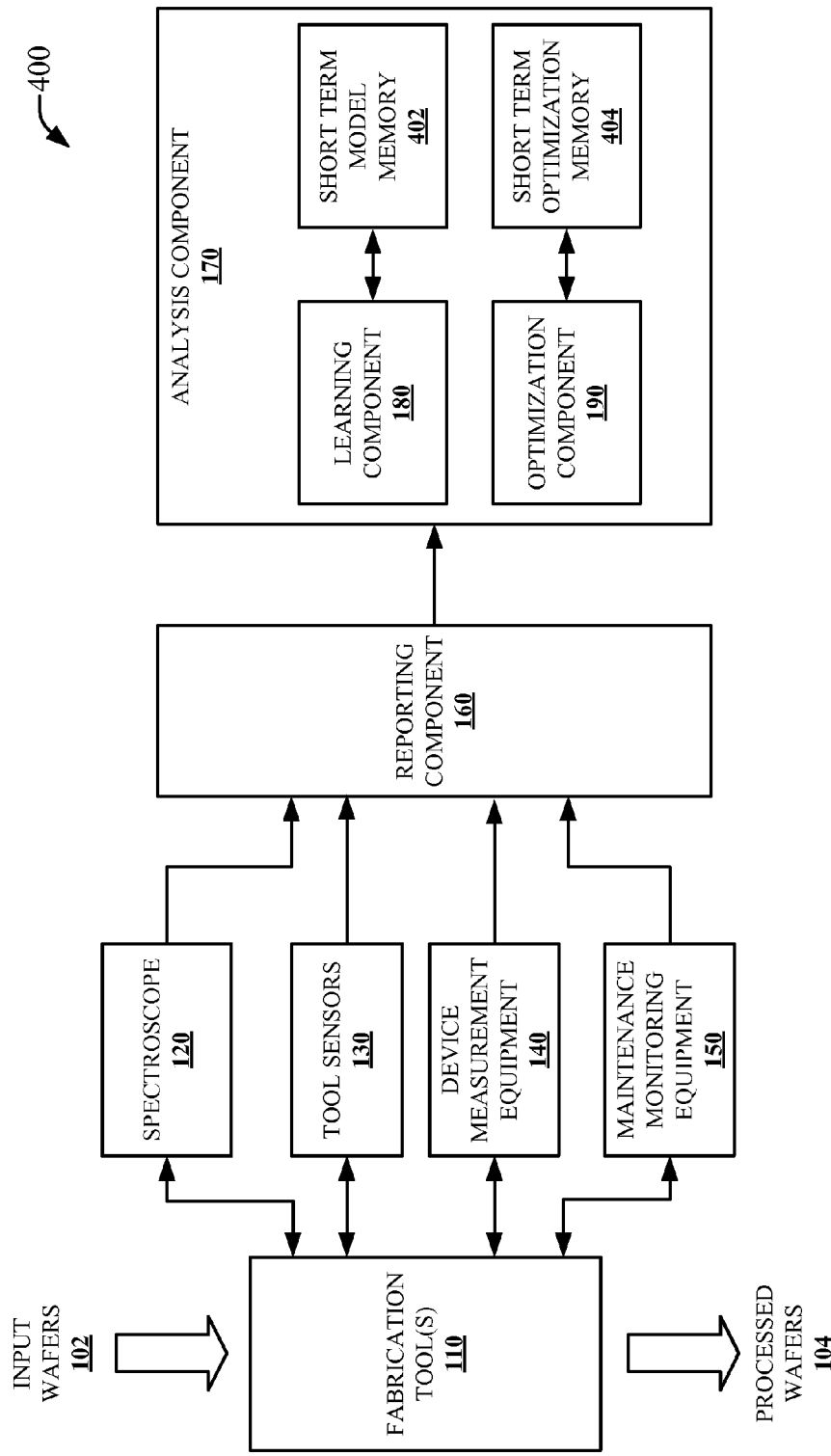
FIG. 4 is block diagram illustrating an exemplary system for learning and/or optimizing processes relating to semiconductor production that includes short term memory, in accordance with various aspects and implementations described herein.

FIG. 4 is block diagram illustrating an exemplary system 400 for facilitating learning and/or optimizing of manufacturing processes. System 400 can include the fabrication tool(s) 110, the spectroscope 120, the tool sensors 130, the device measurement equipment 140, the maintenance monitoring equipment 150, the reporting component 160 and the analysis component 170. The analysis component 170 can include the learning component 180, the optimization component 190, a short term model memory (STMM) 402 and a short term optimization memory (STOM) 404.

STMM 402 can be associated with learning component 180. Furthermore, STMM 402 can store one or more process models. For example, STMM 402 can store candidate process models selected by selection component 212 (e.g., learning component 180). In an aspect, number of candidate process models selected by selection component 212 (e.g., learning component 180) can correspond to number of candidate process models necessary to completely fill STMM 402. As such, STMM 402 can facilitate faster generation of a process model for manufacturing processes associated with fabrication tool(s) 110. Moreover, STMM 402 can facilitate incremental learning to maximize quality and diversity of a process model for manufacturing processes associated with fabrication tool(s) 110. For example, STMM 402 can facilitate incremental learning over time as additional process data is generated during manufacturing processes associated with fabrication tool(s) 110.

STOM 404 can be associated with optimization component 190. Furthermore, STOM 404 can store one or more solutions. For example, STOM 404 can store candidate solutions selected by selection component 312 (e.g., optimization component 190). In an aspect, number of candidate solutions selected by selection component 312 (e.g., optimization component 190) can correspond to number of candidate solutions necessary to completely fill STOM 404. As such, STOM 404 can facilitate faster generation of solutions for a process model for manufacturing processes associated with fabrication tool(s) 110. Moreover, STOM 404 can facilitate optimization to maximize quality of solutions while reducing overfitting by maintaining a diverse set of solutions.

In an aspect, learning component 180 can retrieve one or more candidate process models stored in STMM 402, compute a quality value for one or more candidate process models stored in STMM 402 and/or generate one or more other candidate process models, as more fully disclosed herein. As such, STMM 402 can facilitate incremental learning so that process data associated with one or more fabrication tools can be constantly improved over time. Furthermore, STMM 402 can facilitate faster process model development while maintaining a diverse set of high quality candidate process models for process modeling in a semiconductor fabrication system. Additionally, probability of over fitting can be reduced by implementing STMM 402, while facilitating adaptation to changing manufacturing situations by maintaining a set of diverse high quality models for process modeling in a semiconductor fabrication system.

In another aspect, optimization component 190 can retrieve one or more candidate solutions stored in STOM 404, compute a quality value for one or more candidate solutions stored in STOM 404 and/or generate one or more other candidate solutions, as more fully disclosed herein. As such, STOM 404 can facilitate incremental optimization so that process data associated with one or more fabrication tools can be constantly improved over time. Furthermore, STOM 404 can facilitate faster process optimization while maintaining a diverse set of high quality candidate solutions for process optimization in a semiconductor fabrication system. Additionally, probability of over fitting can be reduced by implementing STOM 404, while facilitating adaptation to changing manufacturing situations by maintaining a set of diverse high quality solutions for process control and/or process optimization in a semiconductor fabrication system.

In yet another aspect, the learning process implemented by learning component 180 can be rerun each time new process data becomes available. However, an initial population of data can be initially seeded with data stored in STMM 402. As such, the result of relearning can modify data stored in STMM 402. Accordingly, as more and more process data is obtained and/or made available, learning component 180 can consider process models with highest quality that survive over diverse manufacturing situations. Therefore, improved process models can be obtained over time. Furthermore, by implementing STMM 402, the learning process implemented by learning component 180 is not required to start from scratch (e.g., learning time can be reduced) and/or over fitting can be avoided (e.g., accuracy of a utilized process model can be improved). Similarly, as new process data becomes available, the optimization process implemented by optimization component 190 can be rerun by seeding an initial population of data with data stored in STOM 404. Accordingly, by maintaining a diverse set of solutions in STOM 404, more rapid generation of a solution can be realized and/or quality of a utilized solution can be improved. Furthermore, by maintaining a diverse set of solutions in STOM 404, probability of over fitting can be reduced and/or accuracy of solutions can be improved. Moreover, by implementing STMM 402 and/or STOM 404, error between predicted values and measured values can be reduced.

Figure 5:
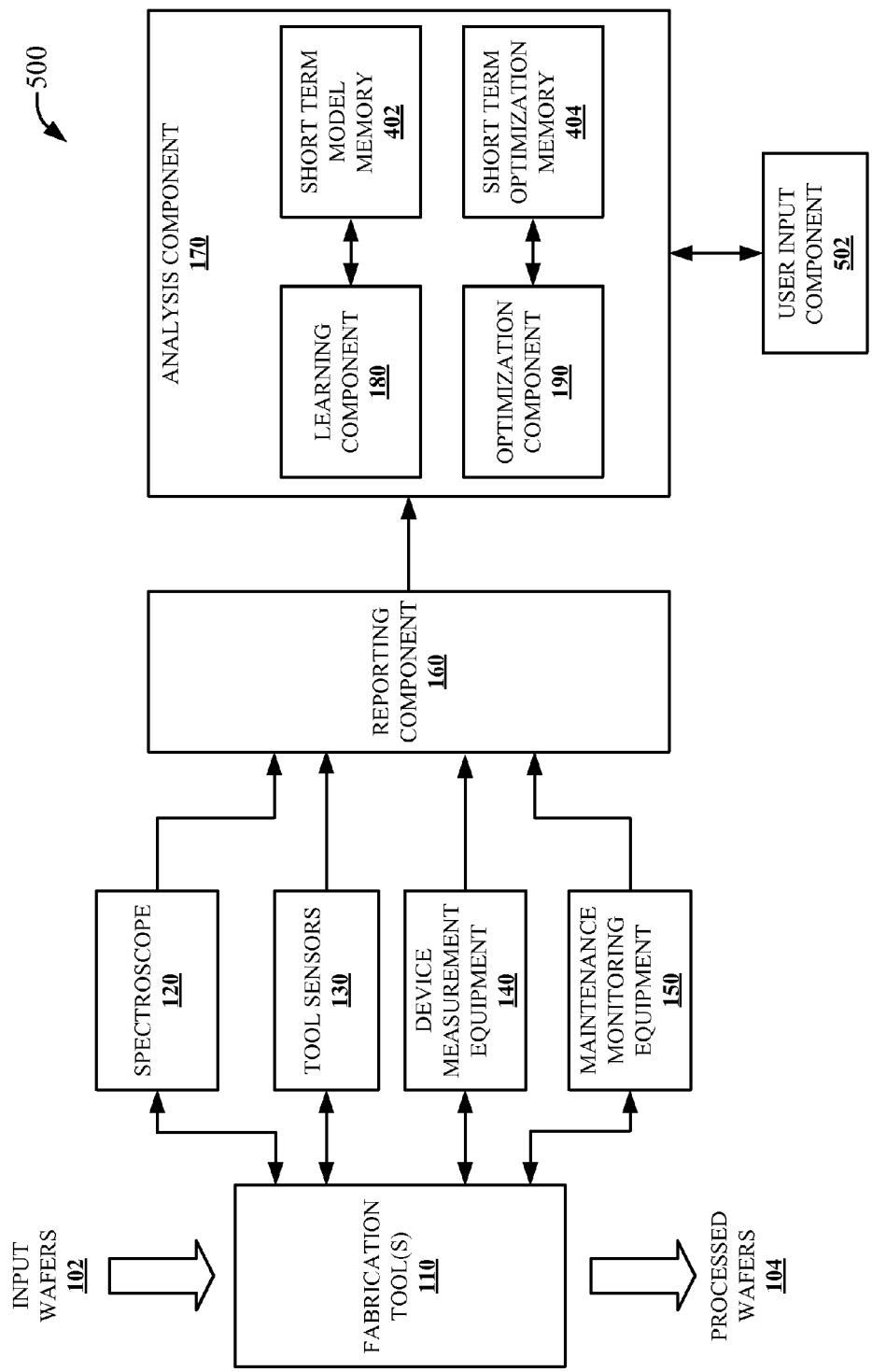
FIG. 5 is block diagram illustrating an exemplary system for learning and/or optimizing processes relating to semiconductor production based on user input, in accordance with various aspects and implementations described herein.

FIG. 5 is block diagram illustrating an exemplary system 500 for facilitating learning and/or optimizing of manufacturing processes based on user input. System 500 can include the fabrication tool(s) 110, the spectroscope 120, the tool sensors 130, the device measurement equipment 140, the maintenance monitoring equipment 150, the reporting component 160, the analysis component 170 and a user input component 502. The analysis component 170 can include the learning component 180, the optimization component 190, the STMM 402 and the STOM 404.

User input component 502 can be configured to receive input from and provide output to a user of system 500. For example, user input component 502 can render an input display screen to a user that prompts for user specifications, and accepts such specifications from the user via any suitable input mechanism (e.g., keyboard, touch screen, etc.). In an aspect, user input component 502 can allow a user (e.g., an external agent) capability to include measurements at different frequencies such as power every ¹⁄₁₀th second, pressure every seconds, metrology every run, etc. In another aspect, user input component 502 can allow a user (e.g., an external agent) to specify replication of data (e.g., less frequent readings can be replicated until a next reading of data) and/or reduction of data (e.g., keep a row of data for a lowest frequency measurement and/or use a statistical summary of values of other less frequent samples). A statistical summary can include operations such as, but not limited to, a mean value, a min value, a max value, a range of values, a standard deviation value, etc. In yet another aspect, user input component 502 can allow a user (e.g., an external agent) to mark a column of a data matrix as selected output and/or mark other columns of a data matrix as tunable process parameters (i.e., inputs).

In yet another aspect, user input component 502 can allow a user (e.g., an external agent) to specify allowable range of values permitted for each tunable process parameter (e.g., each input parameters) associated with a process model. For example, user input component 502 can allow a user to specify a range (e.g., a minimum value, a maximum value, a mean value, a standard deviation value, etc.) for each of the parameters (e.g., input parameters, tunable inputs, etc.). In yet another aspect, user input component 502 can allow a user (e.g., an external agent) to specify an available size (e.g., number of slots for process models and/or solutions) of a memory (e.g., STMM 402 and/or STOM 404). In yet another aspect, user input component 502 can allow a user (e.g., an external agent) to specify a target output value for a process model. In yet another example, user input component 502 can allow a user (e.g., an external agent) to specify a quality measure to generate a quality value from a library of statistical quality measures and/or to specify a custom quality measure for a quality value. Furthermore, user input component 502 can allow a user (e.g., an external agent) to specify a uniqueness measure to generate a diversity value from a library of statistical uniqueness measures and/or to specify a custom uniqueness measure for a diversity value. However, it is to be appreciated that user input component 502 can be implemented to allow a user to specify (e.g., input) other types of information and/or data to facilitate learning and/or optimizing of manufacturing processes.

FIG. 6 is an exemplary data matrix 600 in accordance with various aspects and implementations of this disclosure. Data matrix 600 can facilitate learning and/or optimizing of manufacturing processes. Process data associated with fabrication tool(s) 110 can be consolidated in the data matrix 600. For example, process data included in the data matrix 600 can be generated and/or acquired by spectroscope 120, tool sensors 130, device measurement equipment 140 and/or maintenance monitoring equipment 150. In an aspect, data matrix 600 can be generated by reporting component 160.

Data matrix 600 can include sensor measurement data, spectral data, device measurement data and/or maintenance data. Sensor measurement data can include, but is not limited to chamber pressure, gas flow, power data, elapsed time in seconds of a process, etc. Spectral data can include, but is not limited to, spectral intensities (e.g., tick by tick spectral measurements for all measured wavelengths), etc. Device measurement data can include, but is not limited to, dimension data, thickness, at one or more measurement targets on a wafer, etc. Maintenance data can include, but is not limited to, elapsed time since a last preventative maintenance, age of components (e.g., production time associated with a component), etc. In an aspect, at least a portion of data included in the data matrix 600 can be provided via user input component 502, modified via user input component 502, selected via user input component 502, etc.

In the non-limiting example shown in FIG. 6, data matrix 600 can include field 602, field 604, field 606, field 608 and field 610. For example, field 602 (e.g., Wafer-ID field) can capture a unit of processing (e.g., a wafer). Field 604 (e.g., Time field) can report elapsed time (e.g., elapsed seconds) for a process associated with the unit of processing (e.g., the wafer). In an aspect, the process may be partitioned into one or more steps. As such, data matrix 600 can additionally include a Step-ID field (not shown). Field 606 can include sensor measurement data. For example, one or more fields after a time field can include tool sensor measurement data. In FIG. 6, field 606 indicates pressure. However, it is to be appreciated that other type of sensor measurement data (e.g., such as, but not limited to, gas flow, power data, etc.) can additionally or alternatively be included in data matrix 600. Field 608 can include spectral data. For example, field 608 can include a spectra intensity measurement (e.g., wavelength 'W260'). However, it is to be appreciated that other spectral data can additionally or alternatively be included in data matrix 600 (e.g., other wavelengths, etc.). In an aspect, an arbitrary number of spectral data (e.g., wavelengths) can be included in data matrix 600. Field 610 can include device measurement data (e.g., FI-CD). However, it is to be appreciated that data matrix 600 can additionally or alternatively include other device measurement data (e.g., etch bias, etc.). In an aspect, field 610 can include a location number (e.g., a tool number) associated with the device measurement data. For example, a number in parentheses (e.g., '(1)') can identify a location number (e.g., a tool number). It is to be appreciated that data matrix 600 can additionally or alternatively include other types of data (e.g., maintenance data, etc.).

In an aspect, metrology measurements for obtaining data included in data matrix 600 can be performed prior to processing. In another aspect, metrology measurements for obtaining data included in data matrix 600 can be performed subsequent to processing. It is to be appreciated that a single metrology measurement or in-situ metrology can be implemented per unit of processing (e.g., per wafer). Furthermore, it is to be appreciated that other types of data can be included in data matrix 600 such as, but not limited to, throughput, efficiency, etc.

FIG. 7 is an exemplary ranking 700 of candidate process models in accordance with various aspects and implementations of this disclosure. In an aspect, ranking 700 can be associated with ranking component 210 (e.g., learning component 180). Column 702 includes process models (e.g., candidate process models) associated with ranking 700. For example, column 702 can represent candidate process models included in a set of candidate process models. Column 704 can include quality values associated with the set of candidate process models included in column 702. In the non-limiting example shown in FIG. 7, quality values in column 704 are associated with normalized MSE (e.g., 1/(1−MSE)). As such, a higher quality value corresponds to a lower error measurement. Column 706 can represent diversity values associated with the set of candidate process models included in column 702. In the non-limiting example shown in FIG. 7, diversity values in column 706 are associated with a cosine function. As such, a higher diversity value corresponds to greater diversity (e.g., a diversity value equal to zero corresponds to no diversity).

Selected candidate (e.g., candidate_2) can be a candidate process model in a set of candidate process models with highest quality (e.g., selected candidate (e.g., candidate_2) is ranked first). For example, selected candidate (e.g., candidate_2) can be identified by identification component 208. The set of candidate process models shown in FIG. 7 includes seven candidate process models. However, it is to be appreciated that the set of candidate process models can include a different number of candidate process models. In the non-limiting example shown in FIG. 7, candidate_1 is ranked second, candidate_5 is ranked third, candidate_7 is ranked fourth, candidate_4 is ranked fifth, candidate_3 is ranked sixth and candidate_6 is ranked seventh.

Ranking 700 is ranked initially based on quality values associated with candidate_1 through candidate_7. In the non-limiting example shown in FIG. 7, selected candidate (e.g., candidate_2) can be associated with a quality value equal to 0.91, and is therefore ranked first. Selected candidate (e.g., candidate_2) is not associated with a diversity value since each of the other candidate process models are compared to the selected candidate (e.g., candidate_2) to determine diversity (e.g., uniqueness, similarity, etc.). Candidate_1 is ranked second since candidate_1 is associated with a quality value equal to 0.90 (e.g., the second highest quality value). However, candidate_5 and candidate_7 are both associated with a quality value equal to 0.86 (e.g., the third highest quality value). However, since candidate_5 is associated with a diversity value equal to 0.79 and candidate_7 is associated with a diversity value equal to 0.76 (e.g., candidate_5 is more unique compared with the selected candidate), candidate_5 is ranked third and candidate_7 is ranked fourth. In an aspect, one or more candidate process models can be selected for storage in the STMM 402 based on the ranking 700. As such, selection of candidate process models that are associated with lowest error while being maximally diverse can be easily, quickly and/or optimally selected via ranking 700. Moreover, ranking 700 can facilitate selection of a subset of candidate process models with a strong correlation to high quality while being diverse to prevent being limited to overly similar process models (e.g., to prevent overfitting). Therefore, quality of processed wafers 104 generated by fabrication tool(s) 110 can be improved while considering different conditions and/or manufacturing situations (e.g., process cycles) associated with fabrication tool(s) 110.

It is to be appreciated that ranking 700 can alternatively be a ranking of candidate solutions in accordance with various aspects and implementations of this disclosure. For example, ranking 700 can be associated with ranking component 308 (e.g., optimization component 190). As such, candidate solutions can similarly be ranked based on quality values and diversity values, as discussed above with respect to candidate process models. Accordingly, in an aspect, one or more candidate solutions can be selected for storage in the STOM 404 based on the ranking 700. Furthermore, selection of candidate solutions that are associated with lowest error while being maximally diverse can be easily, quickly and/or optimally selected via ranking 700. Moreover, ranking 700 can facilitate selection of a subset of candidate solutions with a strong correlation to high quality while being diverse to prevent being limited to overly similar solutions (e.g., to prevent overfitting). Therefore, quality of processed wafers 104 generated by fabrication tool(s) 110 can be improved while considering different conditions and/or manufacturing situations (e.g., process cycles) associated with fabrication tool(s) 110.

FIG. 8 is an exemplary ranking 800 of candidate solutions in accordance with various aspects and implementations of this disclosure. In an aspect, ranking 800 can be associated with ranking component 308 (e.g., optimization component 190). For example, ranking 800 can be associated with a ranking of candidate solutions to determine a candidate solution with highest quality. Column 802 include solutions (e.g., candidate solutions) associated with ranking 800. Candidate solutions can be ranked based on a selected candidate process model (e.g., the selected candidate (e.g., candidate_2) shown in FIG. 7). For example, candidate solutions can be ranked with respect to a target output value associated with the selected candidate (e.g., candidate_2) shown in FIG. 7. In the non-limiting example shown in FIG. 8, the selected candidate process model (e.g., the selected candidate (e.g., candidate_2) shown in FIG. 7) can be associated with three input parameters. As such, candidate solutions included in column 802 can be associated with a first input parameter included in column 806, a second input parameter included in column 808, and a third input parameter included in column 810. Column 812 can include quality values associated with the set of candidate solutions included in column 802. Column 814 can represent diversity values associated with the set of candidate solutions included in column 802.

Furthermore, in the non-limiting example shown in FIG. 8, a target output value for the selected candidate process model (e.g., the selected candidate (e.g., candidate_2) shown in FIG. 7) is 1300. The selected candidate process model (e.g., the selected candidate (e.g., candidate_2) shown in FIG. 7) can be utilized to predict an output value for each of the candidate solutions included in column 802. The predicted output values for each of the candidate solutions can be included in column 804. A quality value can correspond to an error measurement between an output value (e.g., a predicted output value) of a candidate solution and the target output value. In the non-limiting example shown in FIG. 8, quality values in column 812 are associated with normalized MSE (e.g., 1/(1−MSE)). As such, a higher quality value corresponds to a lower error measurement. A diversity value can correspond to diversity between candidate solutions (e.g., diversity between input parameters of candidate solutions). In the non-limiting example shown in FIG. 8, diversity values in column 814 are associated with a cosine function. As such, a higher diversity value corresponds to greater diversity (e.g., a diversity value equal to zero corresponds to no diversity).

As such, ranking 800 can be ranked based on column 804 (e.g., output values associated with candidate solutions included in column 802), column 812 (e.g., quality values associated with candidate solutions included in column 802) and/or column 814 (e.g., diversity values associated with candidate solutions included in column 802). Accordingly, in the non-limiting example shown in FIG. 8, candidate_3 is ranked first since an output value of 1299 is closest to the target output value of 1300 (e.g., the output value of candidate_3 includes the lowest variance with respect to the target output value). Furthermore, candidate_1 is ranked second, candidate_4 is ranked third and candidate_2 is ranked fourth when ranked with respect to a corresponding output value, quality value and/or diversity value. In the non-limiting example shown in FIG. 8, candidate_3 is not associated with a diversity value since each of the other candidate solutions (e.g., input parameters for each of the other candidate solutions) are compared to candidate_3 (e.g., input parameters for candidate_3) to determine diversity (e.g., uniqueness, similarity, etc.).

Figure 9:
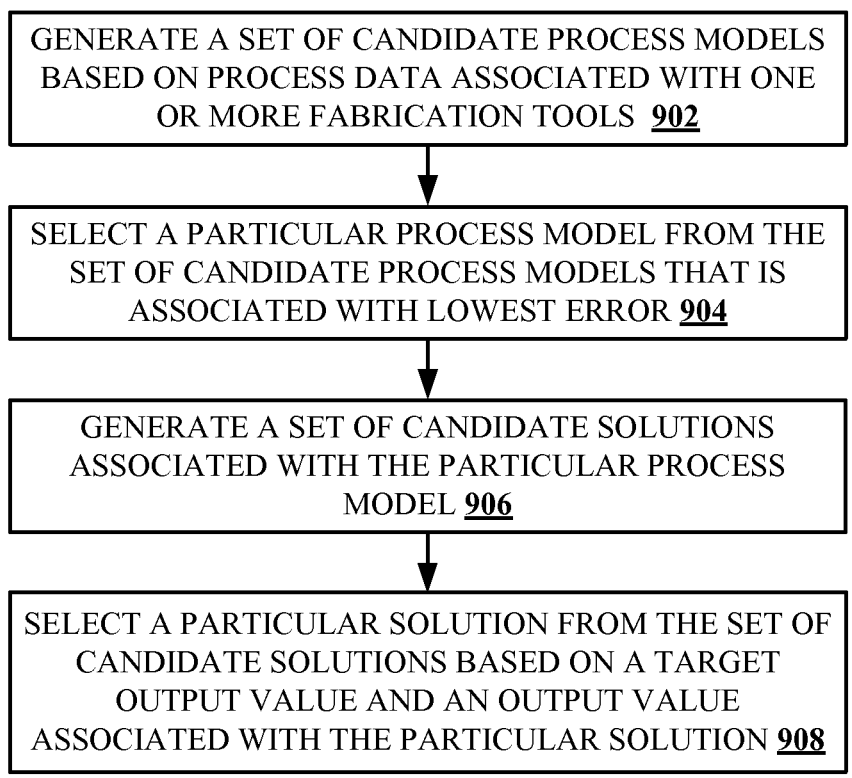
FIG. 9 is a flowchart of an example methodology for learning, controlling and/or optimizing processes in a semiconductor fabrication system, in accordance with various aspects and implementations described herein.
Figure 10:
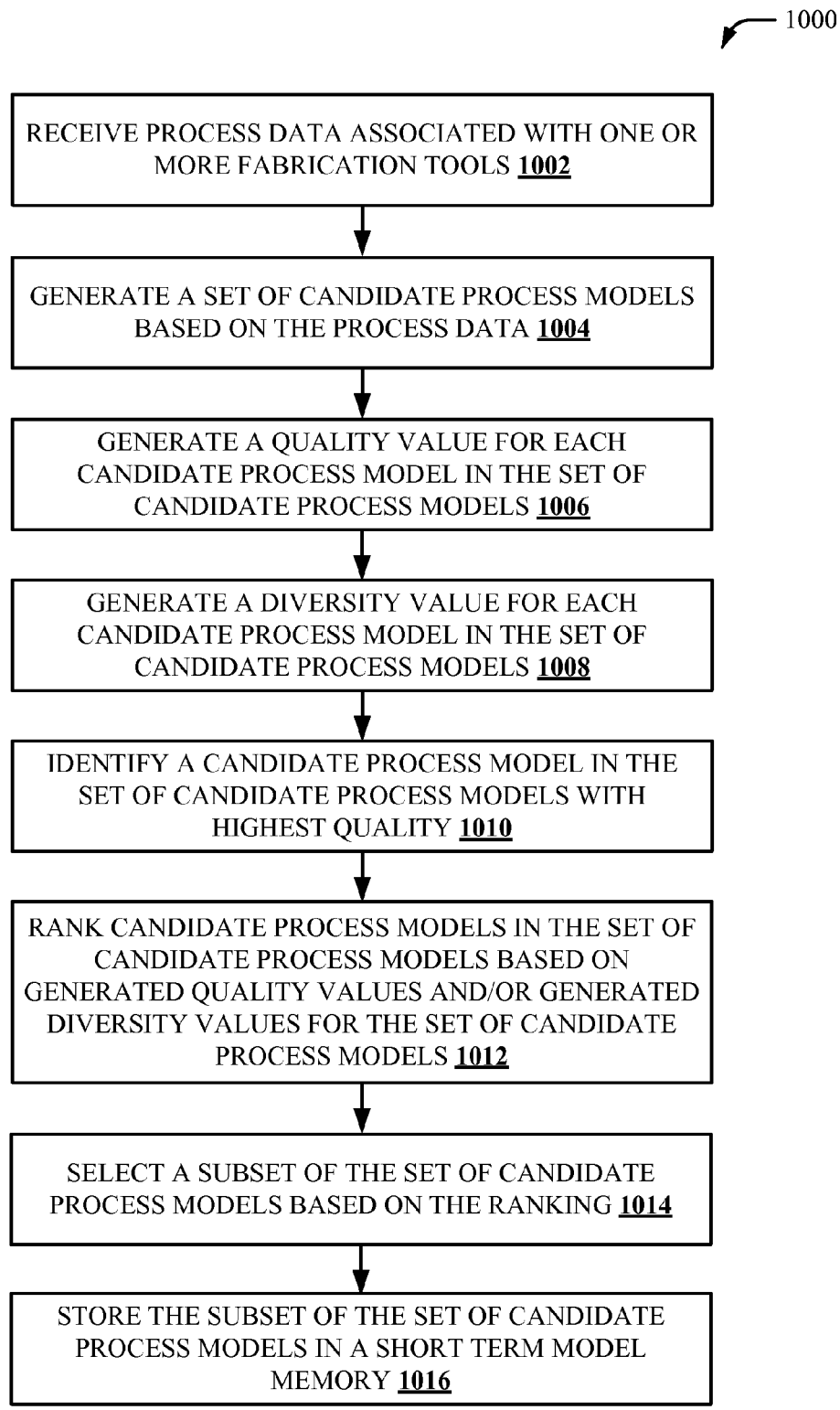
FIG. 10 is a flowchart of an example methodology for learning processes in a semiconductor fabrication system, in accordance with various aspects and implementations described herein.
Figure 11:
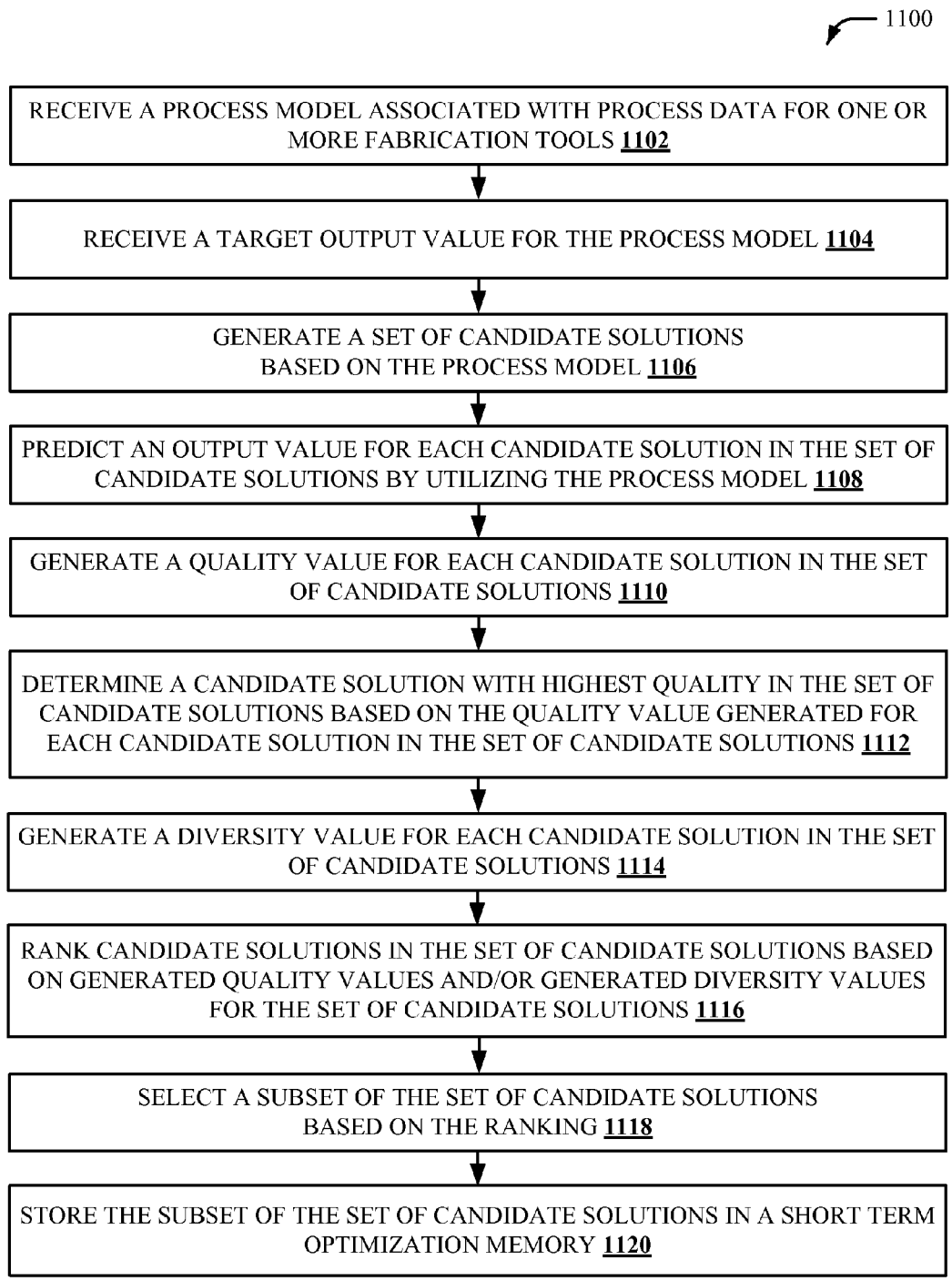
FIG. 11 is a flowchart of an example methodology for controlling and/or optimizing processes in a semiconductor fabrication system, in accordance with various aspects and implementations described herein.

FIGS. 9-11 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 9 illustrates an example methodology 900 for learning, controlling and/or optimizing processes in a semiconductor fabrication system. Initially, at 902, a set of candidate process models is generated (e.g., by a learning component 180) based on process data associated with one or more fabrication tools. For example, a set of potential process models for one or more manufacturing tools can be generated based on sensor measurement data, spectral data, device measurement data and/or maintenance data.

At 904, a particular process model that is associated with lowest error is selected (e.g., by a learning component 180) from the set of candidate process. For example, a particular process model that is associated with a lowest MSE value can be selected from the set of candidate process models.

At 906, a set of candidate solutions associated with the particular process model is generated (e.g., by an optimization component 190). For example, each candidate solution can be a set of values for inputs associated with the particular process model.

At 908, a particular solution from the set of candidate solutions is selected (e.g., by an optimization component 190) based on a target output value and an output value associated with the particular solution. For example, a particular solution from the set of candidate solutions that is associated with lowest variance (e.g., based on a target output value and an output value associated with the particular solution) can be selected.

FIG. 10 illustrates an example methodology 1000 for learning processes in a semiconductor fabrication system. Initially, at 1002, process data associated with one or more fabrication tools is received (e.g., by learning component 180). For example, process data can include, but is not limited to, sensor measurement data, spectral data, device measurement data and/or maintenance data. In an aspect, process data can be associated with a data matrix.

At 1004, a set of candidate process models is generated (e.g., by candidate component 202) based on the process data. For example, a set of mathematical process models (e.g., a set of candidate functions) can be generated based on process data associated with one or more fabrication tools. In an aspect, one or more genetic algorithms can be implemented to generate each candidate process model in the set of candidate process models. In another aspect, a curve fitting technique can be implemented to generate each candidate process model in the set of candidate process models. For example, each candidate process model in the set of candidate process models can be generated using linear approximation, multi-linear approximation, polynomial curve fitting, neural networks, etc. However, it is to be appreciated that a different type of technique can be implemented to generate each candidate process model in the set of candidate process models.

At 1006, a quality value is generated (e.g., by quality component 204) for each candidate process model in the set of candidate process models. For example, a predicted performance indicator can be generated for each candidate process model in the set of candidate process models. In an aspect, the quality value for each candidate process model in the set of candidate process models can be associated with a MSE value. For example, the quality value for each candidate process model in the set of candidate process models can be associated with a root MSE value. In another aspect, the quality value for each candidate process model in the set of candidate process models can be associated with a correlation value. In yet another aspect, the quality value for each candidate process model in the set of candidate process models can be associated with a coefficient of determination value. However, it is to be appreciated that another type of quality measurement can be associated with the quality value for each candidate process model in the set of candidate process models. In an aspect, the quality value for each candidate process model in the set of candidate process models can be a normalized value. For example, the quality value for each candidate process model in the set of candidate process models can be equal to $1/(1-MSE)$.

At 1008, a diversity value is generated (e.g., by diversity component 206) for each candidate process model in the set of candidate process models. For example, a similarity indicator (e.g., a uniqueness indicator) can be generated for each candidate process model in the set of candidate process models. In one example, an output value generated by a candidate process model in the set of candidate process models can be compared with other output values generated by other candidate process models in the set of candidate process models. In an aspect, the diversity value for each candidate process model in the set of candidate process models can be associated with a cosine function (e.g., a first output vector associated with a candidate process model and a second output vector associated with another candidate process model). In another aspect, the diversity value for each candidate process model in the set of candidate process models can be associated with a Halstead metric (e.g., a Halstead complexity measure). In yet another aspect, the diversity value for each candidate process model in the set of candidate process models can be associated with inverse of similarity measurements. However, it is to be appreciated that another type of diversity measurement can be associated with the diversity value for each candidate process model in the set of candidate process models.

At 1010, a candidate process model in the set of candidate process models with highest quality is identified (e.g., by identification component 208). For example, quality values generated for the candidate process models can be compared. In an aspect, a candidate process model in the set of candidate process models associated with lowest error (e.g., a lowest MSE value) can be identified.

At 1012, candidate process models in the set of candidate process models are ranked (e.g., by ranking component 210) based on generated quality values and/or generated diversity values for the set of candidate process models. For example, the set of candidate process models can be initially ranked based on corresponding quality values (e.g., the identified candidate process model with highest quality is ranked first, a candidate process model with second highest quality is ranked second, etc.). Furthermore, the set of candidate process models can be ranked based on corresponding diversity values. For example, a ranking of candidate process models with the same quality value can be determined based on a corresponding diversity value (e.g., the candidate process model with a higher diversity value can be ranked higher). As such, a higher ranking can correspond to higher quality (e.g., a lower error value) and greater diversity (e.g., greater uniqueness compared to other candidate process models).

At 1014, a subset of the set of candidate process models is selected (e.g., by selection component 212) based on the ranking. For example, a certain number of candidate process models with highest ranking (e.g., top three most highly ranked, top five most highly ranked, etc.) can be selected. In an aspect, the subset of the candidate process models can be selected based on an available size of a memory. For example, a certain number of candidate process models with a high ranking can be selected based on an available size of a memory (e.g., a short term model memory).

At 1016, the subset of the set of candidate process models is stored in a short term model memory (e.g., STMM 402). As such, incremental learning based on process data associated with one or more fabrication tools can be constantly improved over time. Furthermore, faster process model development can be employed while maintaining a diverse set of high quality candidate process models in short term memory. Additionally, probability of over fitting can be reduced while adapting to changing manufacturing situations by maintaining a set of diverse high quality models for process modeling in short term memory.

FIG. 11 illustrates an example methodology 1100 for controlling and/or optimizing processes in a semiconductor fabrication system. In an aspect, methodology 1100 can be implemented in connection with methodology 1000. Initially, at 1102, a process model associated with process data for one or more fabrication tools is received (e.g., by optimization component 190). For example, a process model selected with highest quality among a set of candidate process models can be received. In an aspect, the received process model can be the process model identified in 1010 of methodology 1000.

At 1104, a target output value for the process model is received (e.g., by optimization component 190). For example, a target output value (e.g., a desired output value) for the received process model can be received.

At 1106, a set of candidate solutions is generated (e.g., by candidate component 302) based on the process model. For example, each solution in the set of candidate solutions can be a set of values for inputs (e.g., input parameters) associated with the process model. In an aspect, each solution in the set of candidate solutions can be generated based on one or more genetic algorithms. In another aspect, each solution in the set of candidate solutions can be generated based on simulated annealing. In yet another aspect, each solution in the set of candidate solutions can be generated based on hill climbing optimization technique. However, it is to be appreciated that each solution in the set of candidate solutions can be generated based on a different type of optimization technique.

At 1108, an output value for each candidate solution in the set of candidate solutions is predicted (e.g., by prediction component 304) by utilizing the process model. For example, a first output value for a first candidate solution can be generated by utilizing the process model, a second output value for a second candidate solution can be generated by utilizing the process model, etc. As such, a set of output values can be generated based on the process model and the set of candidate solutions.

At 1110, a quality value is generated (e.g., by quality component 306) for each candidate solution in the set of candidate solutions. The quality value can be a quality indicator for an output value of a candidate solution compared to the target output value. For example, a quality value can indicate variance between an output value of a candidate solution and the target output value. In an aspect, the quality value for each candidate process model in the set of candidate process models can be associated with a MSE value. For example, the quality value for each candidate process model in the set of candidate process models can be associated with a root MSE value. In another aspect, the quality value for each candidate process model in the set of candidate process models can be associated with a correlation value. In yet another aspect, the quality value for each candidate process model in the set of candidate process models can be associated with a coefficient of determination value. However, it is to be appreciated that another type of quality measurement can be associated with the quality value for each candidate process model in the set of candidate process models. In an aspect, the quality value for each candidate process model in the set of candidate process models can be a normalized value. For example, the quality value for each candidate process model in the set of candidate process models can be equal to $1/(1-MSE)$.

At 1112, a candidate solution with highest quality in the set of candidate solutions is determined (e.g., by ranking component 308) based on the quality value generated for each candidate solution in the set of candidate solutions. For example, a candidate solution with a target value corresponding to lowest error between the output value for the candidate solution and the target output value (e.g., a quality value corresponding to lowest MSE) can be selected as the candidate solution with highest quality.

At 1114, a diversity value is generated (e.g., by diversity component 310) for each candidate solution in the set of candidate solutions. The diversity value can be a measure of uniqueness of a particular candidate solution with respect to the candidate solution with highest quality (e.g., determined at 1012). In an aspect, the diversity value for each candidate process model in the set of candidate process models can be associated with a cosine function (e.g., a first output vector associated with a particular candidate solution and a second output vector associated with the candidate solution with highest quality). In another aspect, the diversity value for each candidate process model in the set of candidate process models can be associated with a Halstead metric (e.g., a Halstead complexity measure). In another aspect, the diversity value for each candidate process model in the set of candidate process models can be associated with an inverse of similarity measurements. However, it is to be appreciated that another type of diversity measurement can be implemented to generate the diversity value for each candidate process model in the set of candidate process models.

At 1116, candidate solutions in the set of candidate solutions are ranked (e.g., by ranking component 308) based on generated quality values and/or generated diversity values for the set of candidate solutions. For example, the set of solutions can be initially ranked based on corresponding quality values (e.g., the candidate solution with highest quality is ranked first, a candidate solution with second highest quality is ranked second, etc.). Furthermore, the set of candidate solutions can be ranked based on corresponding diversity values. For example, a ranking of candidate solutions with the same quality value can be determined based on a corresponding diversity value (e.g., the candidate solution with a higher diversity value can be ranked higher). As such, a higher ranking can correspond to higher quality (e.g., a lower error value) and greater diversity (e.g., greater uniqueness compared to the candidate solution with highest quality).

At 1118, a subset of the set of candidate solutions is selected (e.g., by selection component 312) based on the ranking. For example, a certain number of candidate solutions with highest ranking (e.g., top three most highly ranked, top five most highly ranked, etc.) can be selected. In an aspect, the subset of the solutions can be selected based on an available size of a memory. For example, a certain number of candidate solutions with a high ranking can be selected based on an available size of a memory (e.g., a short term optimization memory).

At 1120, the subset of the set of candidate solutions is stored in a short term optimization memory (e.g., STOM 404). As such, incremental optimization based on process data associated with one or more fabrication tools can be constantly improved over time. Furthermore, faster process optimization can be employed while maintaining a diverse set of high quality candidate solutions for process optimization in short term memory. Additionally, probability of over fitting can be reduced while adapting to changing manufacturing situations by maintaining a set of diverse high quality solutions for process control and/or process optimization in short term memory.

Figure 12:
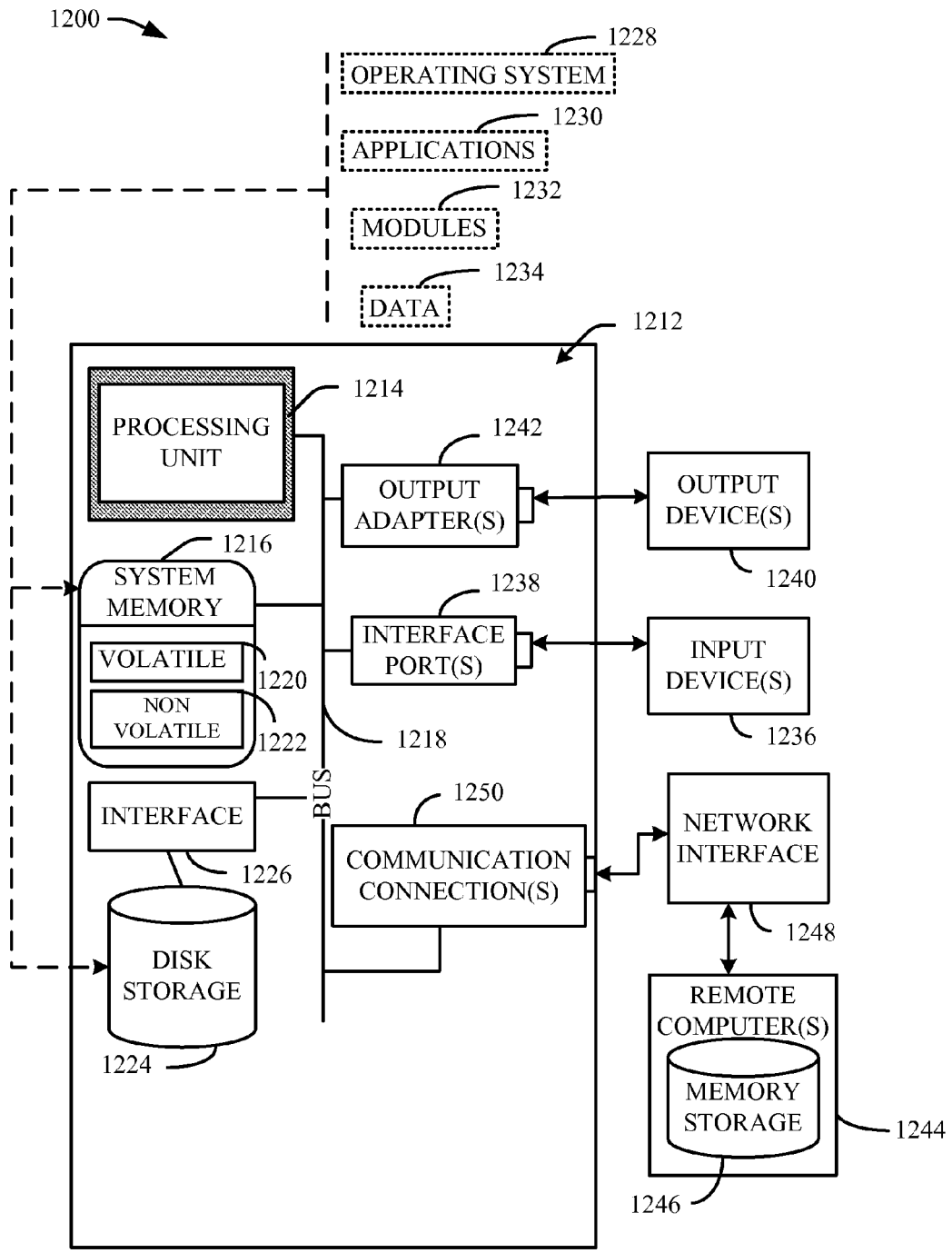
FIG. 12 is a schematic block diagram illustrating a suitable operating environment.
Figure 13:
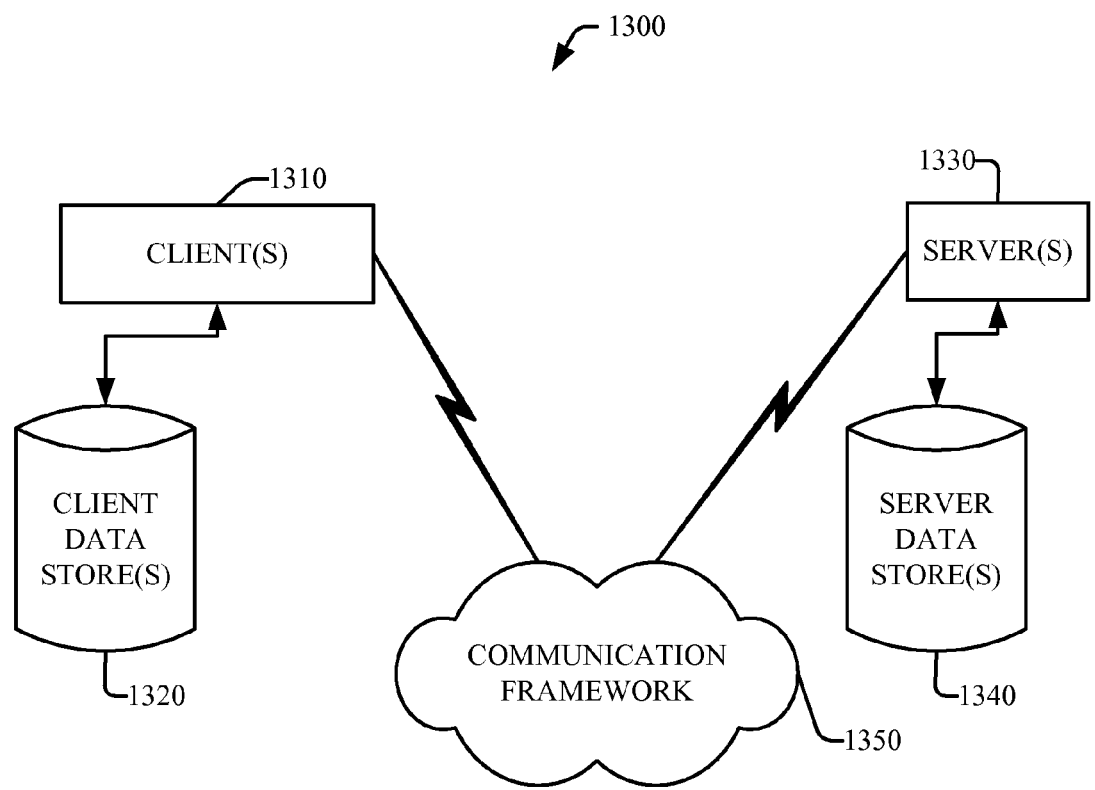
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, a suitable environment 1200 for implementing various aspects of this disclosure includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/nonvolatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory storing computer executable components; and
   a processor configured to execute the following computer executable components stored in the memory:
   a learning component that generates a set of candidate process models based on process data associated with one or more fabrication tools and selects a particular process model from the set of candidate process models that is associated with lowest error; and
   an optimization component that generates a set of candidate solutions associated with the particular process model and selects a particular solution from the set of candidate solutions based on a target output value and an output value associated with the particular solution.

2. The system of claim 1, wherein the process data is associated with a data matrix that includes at least one of sensor measurement data, spectral data, device measurement data and maintenance data.

3. The system of claim 1, wherein the learning component generates a quality value for each candidate process model in the set of candidate process models to facilitate selection of the particular process model from the set of candidate process models.

4. The system of claim 3, wherein the quality value for each candidate process model in the set of candidate process models is associated with mean squared error.

5. The system of claim 3, wherein the learning component further generates a diversity value associated with uniqueness for each candidate process model in the set of candidate process models.

6. The system of claim 5, wherein the diversity value for each candidate process model in the set of candidate process models is generated based on a cosine function.

7. The system of claim 5, wherein the learning component generates a ranking of the set of candidate process models as a function of the quality value and the diversity value for each candidate process model in the set of candidate process models.

8. The system of claim 7, wherein the learning component further selects one or more other process models from the set of candidate process models based on the ranking, and stores the particular process model and the one or more other process models in a short term model memory.

9. The system of claim 1, wherein the optimization component generates a quality value for each candidate solution in the set of candidate solutions to facilitate selection of the particular solution from the set of candidate solutions.

10. The system of claim 9, wherein the quality value for each candidate solution in the set of candidate solutions is associated with mean squared error.

11. The system of claim 9, wherein the optimization component further generates a diversity value associated with uniqueness for each candidate solution in the set of candidate solutions.

12. The system of claim 11, wherein the diversity value for each candidate solution in the set of candidate solutions is generated based on a cosine function.

13. The system of claim 11, wherein the optimization component generates a ranking of the set of candidate solutions as a function of the quality value and the diversity value for each candidate solution in the set of candidate solutions.

14. The system of claim 13, wherein the optimization component further selects one or more other solutions from the set of candidate solutions based on the ranking, and stores the particular solution and the one or more other solutions in a short term optimization memory.

15. A method, comprising:
   employing a processor that facilitates execution of computer executable instructions stored on a non-transitory computer readable medium to implement operations, comprising:
   generating a set of candidate process models based on process data associated with one or more fabrication tools;
   generating a quality value for each candidate process model in the set of candidate process models;
   selecting a particular process model from the set of candidate process models based on the quality value associated with each candidate process model in the set of candidate process models;

generating a set of candidate solutions associated with the particular process model; and selecting a particular solution from the set of candidate solutions based on a target output value and an output value associated with the particular solution.

16. The method of claim 15, further comprising:

generating a diversity value for each candidate process model in the set of candidate process models.

17. The method of claim 16, further comprising:

ranking the set of candidate process models based on the quality value and the diversity value for each candidate process model in the set of candidate process models;

selecting a subset of candidate process models based on the ranking of the set of candidate process models; and storing the subset of candidate process models in a short term model memory.

18. The method of claim 15, further comprising:

generating a quality value and a diversity value for each candidate solution in the set of candidate solutions.

19. The method of claim 18, further comprising:

ranking the set of candidate solutions based on the quality value and the diversity value for each candidate solution in the set of candidate solutions;

selecting a subset of candidate solutions based on the ranking of the set of candidate solutions; and storing the subset of candidate solutions in a short term optimization memory.

20. A computer-readable medium having stored thereon computer-executable instructions that, in response to execution by a system including a processor, cause the system to perform operations, the operations including:

generating a set of candidate process models based on process data associated with one or more fabrication tools;

generating a quality value for each candidate process model in the set of candidate process models;

selecting a particular process model from the set of candidate process models based on the quality value associated with each candidate process model in the set of candidate process models;

generating a set of candidate solutions associated with the particular process model; and selecting a particular solution from the set of candidate solutions based on a target output value and an output value associated with the particular solution.

* * * * *